(12) United States Patent
Kweon et al.

(10) Patent No.: US 9,867,084 B2
(45) Date of Patent: Jan. 9, 2018

(54) METHOD AND APPARATUS FOR ANCHORING TERMINAL IN WIRELESS COMMUNICATION SYSTEM

(71) Applicant: Samsung Electronics Co., Ltd., Suwon-si, Gyeonggi-do (KR)

(72) Inventors: Ki-Suk Kweon, Suwon-si (KR); Alper Yegin, Istanbul (TR); Jung-Shin Park, Seoul (KR); Jin-Sung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 15/029,973

(22) PCT Filed: Oct. 20, 2014

(86) PCT No.: PCT/KR2014/009856
§ 371 (c)(1),
(2) Date: Apr. 15, 2016

(87) PCT Pub. No.: WO2015/057034
PCT Pub. Date: Apr. 23, 2015

(65) Prior Publication Data
US 2016/0255540 A1    Sep. 1, 2016

Related U.S. Application Data

(60) Provisional application No. 61/892,691, filed on Oct. 18, 2013.

(30) Foreign Application Priority Data

Oct. 20, 2014 (KR) ........................ 10-2014-0141760

(51) Int. Cl.
*H04W 4/00* (2009.01)
*H04W 28/08* (2009.01)
(Continued)

(52) U.S. Cl.
CPC ............. *H04W 28/08* (2013.01); *H04L 45/72* (2013.01); *H04W 8/26* (2013.01);
(Continued)

(58) Field of Classification Search
CPC .................................................... H04W 88/16
See application file for complete search history.

(56) References Cited

U.S. PATENT DOCUMENTS

| | | | | |
|---|---|---|---|---|
| 9,609,632 | B2* | 3/2017 | Kim | .............. H04W 72/0406 |
| 2007/0258427 | A1* | 11/2007 | Shaheen | ............. H04W 76/022 |
| | | | | 370/338 |

(Continued)

FOREIGN PATENT DOCUMENTS

WO    2012/157959 A2    11/2012

*Primary Examiner* — Farah Faroul
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present invention relates to a method and apparatus for anchoring of a terminal in a wireless communication system. The method for anchoring the terminal in the wireless communication system may include receiving attribute information indicating whether at least one gateway operating as an anchor for at least one default Packet Data Network (PDN) connection supports session persistence, detecting a new flow generated by an application, determining whether a further PDN connection is required for the flow on the basis of the attribute information indicating whether at least one gateway supports session persistence, and if no further PDN connection is required for the flow, using an Internet Protocol (IP) address allocated by the at least one gateway as a source IP address of the flow.

20 Claims, 15 Drawing Sheets

(51) Int. Cl.
*H04W 8/26* (2009.01)
*H04L 12/721* (2013.01)
*H04W 36/00* (2009.01)
*H04W 36/08* (2009.01)
*H04W 36/22* (2009.01)
*H04W 88/16* (2009.01)
*H04W 76/02* (2009.01)

(52) U.S. Cl.
CPC ....... *H04W 36/0005* (2013.01); *H04W 36/08* (2013.01); *H04W 36/22* (2013.01); *H04W 76/025* (2013.01); *H04W 36/0011* (2013.01); *H04W 76/022* (2013.01); *H04W 88/16* (2013.01)

(56) References Cited

U.S. PATENT DOCUMENTS

| | | |
|---|---|---|
| 2010/0118879 A1 | 5/2010 | Oulai et al. |
| 2011/0170517 A1 | 7/2011 | Bakker et al. |
| 2012/0039304 A1 | 2/2012 | Kim et al. |
| 2012/0063419 A1 | 3/2012 | Zhao et al. |
| 2012/0093167 A1* | 4/2012 | Velandy ............... H04W 76/00 370/401 |
| 2012/0188983 A1 | 7/2012 | Mihaly et al. |
| 2013/0258967 A1* | 10/2013 | Watfa ................... H04W 76/00 370/329 |
| 2014/0029579 A1 | 1/2014 | Cho et al. |
| 2014/0219248 A1* | 8/2014 | Reddiboyana ........ H04W 36/14 370/331 |
| 2014/0235200 A1* | 8/2014 | Cai ......................... H04W 4/24 455/406 |
| 2014/0293882 A1* | 10/2014 | Choi ................... H04W 76/041 370/329 |
| 2014/0307617 A1* | 10/2014 | Laitila ................ H04L 12/1836 370/312 |
| 2014/0307629 A1* | 10/2014 | Liebsch ........... H04W 36/0011 370/328 |
| 2015/0029956 A1* | 1/2015 | Moses ................... H04W 76/02 370/329 |
| 2015/0282145 A1* | 10/2015 | Kim ................... H04W 76/048 455/450 |
| 2016/0037411 A1* | 2/2016 | Franklin .............. H04W 36/24 370/331 |
| 2017/0251405 A1* | 8/2017 | Stojanovski ........ H04W 76/028 |

\* cited by examiner

METHOD AND APPARATUS FOR ANCHORING TERMINAL IN WIRELESS COMMUNICATION SYSTEM

TECHNICAL FIELD

The present invention relates to a technique for supporting multi-anchoring of a terminal in a wireless communication system of a Selective internet protocol (IP) Traffic Offload (SIPTO) environment.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Recently, with the exponential increase in demand for mobile Internet traffic, there is a growing interest in a mobility control technique for effectively handling the mobile traffic in a 3rd Generation Partnership Project (3GPP). For example, a Selected Internet Protocol Traffic Offload (SIPTO) is defined in the 3GPP to effectively handle excessive mobile traffic. In the SIPTO technique, there is an ongoing research on handling the mobile traffic by distributing or offloading traffic concentrated on a Packet Data Network (PDN) GateWay (PGW) located in a center to an area around an access network. For example, in the SIPTO, when a User Equipment (UE) has access to the Internet or another external network via a neighboring base station, a PGW or Local GateWay (LGW) close in distance to the accessed network is selected for the UE by a network so that the UE is anchored to the selected PGW or LGW.

In the SIPTO, the network may detect a movement of the UE to change the PGW or LGW to which the UE is anchored. Therefore, when the UE is connected to the PDN through LGW anchoring, a situation in which the UE has to change the anchoring GW due to a mobility of the UE may frequently occur. However, when a situation occurs in which a change of the GW is necessary during a flow for an Internet Protocol (IP) session is ongoing in the UE, there is a problem in that an ongoing IP session may be disconnected. Meanwhile, if the UE is connected to the PDN through PGW anchoring, the situation in which the UE has to change the anchoring GW due to the mobility of the UE does not frequently occur, but it is ineffective since a situation may occur in which a packet of the UE is unnecessarily subjected to triangle routing.

DISCLOSURE

Technical Problem

Accordingly, an exemplary embodiment of the present invention provides a method and apparatus for creating a default connection for a Packet Data Network (PDN) by using a first-type GateWay (GW) at handover or access of a User Equipment (UE), and for further connecting to a PDN by using a second-type GW on the basis of Internet Protocol (IP) session persistence of a flow generated by the UE.

An exemplary embodiment of the present invention provides a method and apparatus for transmitting, by a network to a UE, attribute information indicating whether a PDN GW of the UE supports session persistence.

An exemplary embodiment of the present invention provides a method and apparatus for determining whether a further PDN connection using another GW is required on the basis of attribute information, received by a UE from a network, indicating whether a PDW GW supports session persistence and IP session persistence of a flow generated by a UE.

An exemplary embodiment of the present invention provides a method and apparatus for transmitting, by a network to a UE, an address selection policy indicating whether a PDN GW of the UE supports session persistence.

An exemplary embodiment of the present invention provides a method and apparatus for selecting a source IP address on the basis of an address selection policy for a PDN GW, received from a network by a UE, and IP session persistence of a flow generated by the UE.

An exemplary embodiment of the present invention provides a method and apparatus for performing a PDN connection using each of a first-type GW and a second-type GW by a UE.

Technical Solution

According to an exemplary embodiment of the present invention, a method of anchoring of a terminal in a wireless communication system may include receiving attribute information indicating whether at least one gateway operating as an anchor for at least one default PDN connection supports session persistence, detecting a new flow generated by an application, determining whether a further PDN connection is required for the flow on the basis of the attribute information indicating whether at least one gateway supports session persistence, and if no further PDN connection is required for the flow, using an IP address allocated by the at least one gateway as a source IP address of the flow.

According to an exemplary embodiment of the present invention, a method of a mobility management entity for anchoring of a terminal in a wireless communication system may include determining at least one gateway operating as an anchor for at least one default PDN connection of the terminal, and transmitting attribute information indicating whether the determined at least one gateway supports session persistence to the terminal.

According to an exemplary embodiment of the present invention, an apparatus for anchoring of a terminal in a wireless communication system may include a communication module for a communication module for transmitting/receiving a signal, and a controller for controlling the communication module to receive attribute information indicating whether at least one gateway operating as an anchor for at least one default PDN connection supports session persistence, detect a new flow generated by an application, determining whether a further PDN connection is required for the flow on the basis of the attribute information indicating whether at least one gateway supports session persistence, and if no further PDN connection is required for the flow, use an IP address allocated by the at least one gateway as a source IP address of the flow.

According to an exemplary embodiment of the present invention, an apparatus of a mobility management entity for anchoring of a terminal in a wireless communication system may include a communication module for transmitting/receiving a signal with respect to at least one terminal, and a controller for determining at least one gateway operating as an anchor for at least one default PDN connection of the terminal, and transmitting attribute information indicating whether the determined at least one gateway supports session persistence to the terminal.

Advantageous Effects

According to an exemplary embodiment of the present invention, attribute information indicating whether a Packet Data Network (PDN) GateWay (GW) of a User Equipment (UE) supports session persistence and an address selection policy can be transmitted by a network to the UE, and upon detecting a new flow by the UE, a source Internet Protocol (IP) address of the flow can be selected on the basis of a feature of the flow and information for the GW. Therefore, changing of the GW is minimized during a flow which requires IP session persistence is maintained, thereby having an effect on decreasing a risk of a session disconnection for the flow. Further, as to a flow which does not require the IP session persistence, a GW located in a center is not selected, thereby avoiding ineffective triangle routing.

BEST MODE

Figure 1A:
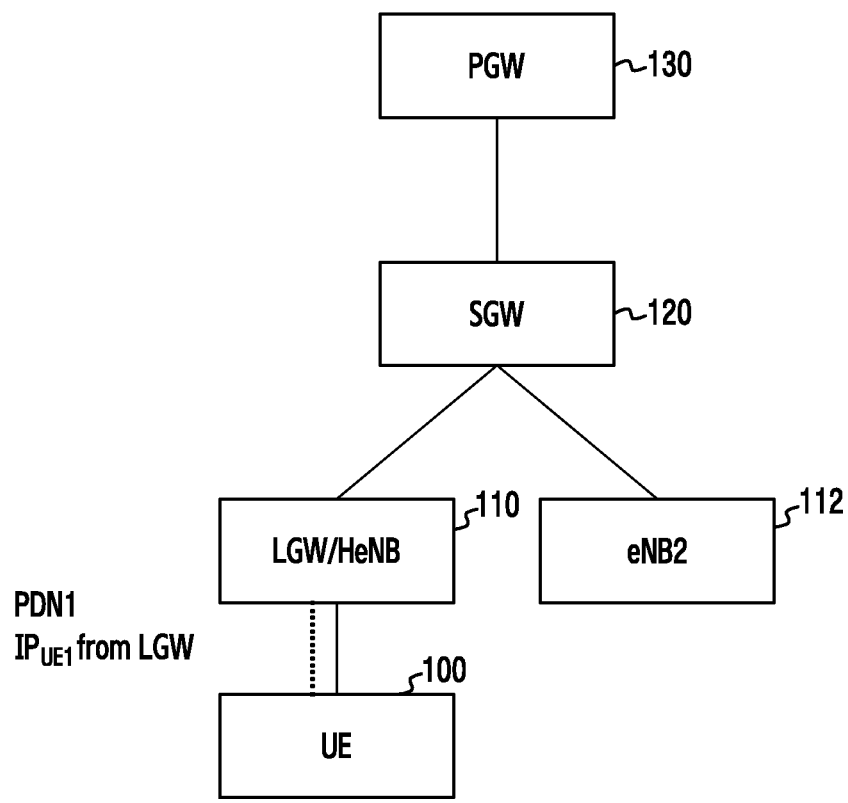
FIG. 1A and FIG. 1B illustrate on-demand dual anchoring according to an exemplary embodiment of the present invention.

Hereinafter, various exemplary embodiments of the present invention are described with reference to the accompanying drawings. While the various exemplary embodiments of the present invention are susceptible to various modifications and alternative forms, a specific embodiment thereof has been shown by way of example in the drawings and will herein be described in detail. It should be understood, however, that it is not intended to limit the various exemplary embodiments of the present invention to the particular form disclosed, but, on the contrary, the various exemplary embodiments of the present invention are to cover all modifications and/or equivalents and alternatives falling within the spirit and scope of the various exemplary embodiments of the present invention as defined by the appended claims. Like reference numerals denote like constitutional elements throughout the drawings The expression "have", "may have", "include", or "may include" used in the various exemplary embodiments of the present invention is intended to indicate a presence of a corresponding function, operation, or constitutional element disclosed herein, and it is not intended to limit a presence of one or more functions, operations, or constitutional elements. In addition, in the various exemplary embodiments of the present invention, the term "include" or "have" is intended to indicate that characteristics, numbers, steps, operations, constitutional elements, and components disclosed in the specification or combinations thereof exist, and thus should be understood that there are additional possibilities of one or more other characteristics, numbers, steps, operations, constitutional elements, components or combinations thereof.

In various exemplary embodiments of the present invention, an expression "A or B", "at least one of A and/or B" or the like may include some or all possible combinations of items enumerated together. For example, "A or B" or "at least one of A and/or B" may include a case where A is included, a case where B is included, or a case where both A and B are included.

Although expressions used in various exemplary embodiments of the present invention such as "1st", "2nd", "first", and "second" may be used to express various constitutional elements of the various exemplary embodiments, it is not intended to limit the corresponding constitutional elements. For example, the above expressions are not intended to limit an order and/or an importance of the corresponding constitutional elements. The above expressions may be used to distinguish one constitutional element from another constitutional element. For example, a 1st user device and a 2nd user device are both user devices, and indicate different user devices. For example, a 1st constitutional element may be termed a 2nd constitutional element, and similarly, the 2nd constitutional element may be termed the 1st constitutional element without departing from the scope of the various exemplary embodiments of the present invention.

When a constitutional element is mentioned as being "connected" to or "accessing" a different constitutional element, this may mean that the constitutional element is directly connected to or accessing the different constitutional element, but it is to be understood that a new different constitutional element may exist between the constitutional element and the different constitutional element. On the other hand, when a constitutional element is mentioned as being "directly connected" to or "directly accessing" a different constitutional element, it is to be understood that a new different constitutional element does not exist between the constitutional element and the different constitutional element.

An expression "configured to" used in the present document may be interchangeably used with, for example, "suitable for", "having the capacity to", "designed to", "adapted to", "made to", or "capable of" according to a situation. A term "configured to" may not imply only "specifically designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

The terminology used in various exemplary embodiments of the present invention is for the purpose of describing particular exemplary embodiments only and is not intended to be limiting of the various exemplary embodiments of the present invention. A singular expression includes a plural expression unless there is a contextually distinctive difference there between.

Unless otherwise defined, all terms (including technical and scientific terms) used herein have the same meaning as commonly understood by those ordinarily skilled in the art to which various exemplary embodiments of the present invention belong. It will be further understood that terms, such as those defined in commonly used dictionaries, should be interpreted as having a meaning that is consistent with their meaning in the context of the relevant art and the various exemplary embodiments of the present invention, and will not be interpreted in an idealized or overly formal sense unless expressly so defined herein.

In addition, although a wireless communication network is described in the specification, an operation achieved in the wireless communication network may be achieved in a process of controlling a network and transmitting data in a system (e.g., a base station) which manages the wireless communication system, or the operation may be achieved in a terminal coupled to the wireless network.

A wireless communication system according to an exemplary embodiment of the present invention includes a plurality of Base Stations (BSs). Each BS provides a communication service to a specific geographical region (generally called a cell). The cell may be divided into a plurality of regions (or sectors).

A Mobile Station (MS) may be fixed or mobile, and may also be called other terms such as a User Equipment (UE), a Mobile Terminal (MT), a User Terminal (UT), a Subscriber Station (SS), a wireless device, a Personal Digital Assistant (PDA), a wireless modem, a handheld device, or the like.

The BS is generally a fixed station which communicates with the MS, and may also be called other terms such as an evolved-NodeB (eNB), a Base Transceiver System (BTS), an access point, or the like. The cell should be interpreted in a comprehensive meaning for indicating a part of an area covered by the BS, and includes all various coverage areas such as a mega cell, a macro cell, a micro cell, a pico cell, a femto cell, or the like.

The present invention relates to a technique of supporting dual anchoring of a user equipment (UE) in a wireless communication system of a Selective IP Traffic Offload (SIPTO) environment. In the following description, a flow which requires Internet Protocol (IP) session persistence (or session continuity) implies a flow which maintains traffic for a long period of time such as in Voice over IP (VoIP) calls or video streaming, and a flow which does not require the IP session persistence may imply a flow which maintains the traffic for a short period of time such as in a web browser. In the following exemplary embodiments, the flow which requires the IP session persistence and the flow which does not require the IP session persistence are not limited thereto.

Figure 1B:
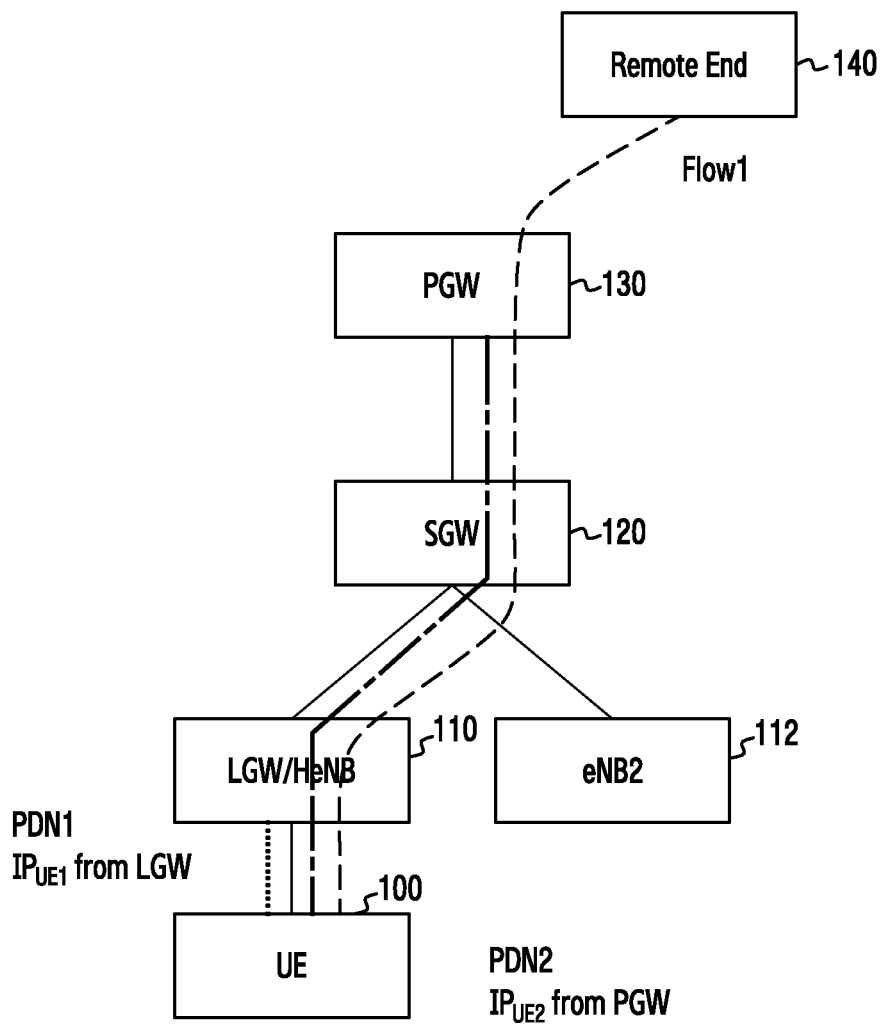

FIG. 1A and FIG. 1B illustrate on-demand dual anchoring according to an exemplary embodiment of the present invention. A wireless communication system according to the exemplary embodiment of the present invention may be configured to include a User Equipment (UE) 100, a Local GateWay (LGW)/Home eNodeB (HeNB) 110, an eNB 112, a Serving GW (SGW) 120, and a PGW 130. In the following description, the LGW/HeNB 110 may be expressed by the LGW 110. The LGW 110 may imply only an LGW which exists in the same position as the HeNB, or may imply both of the LGW and the HeNB.

As shown in FIG. 1A, a network node (e.g., a Mobility Management Entity (MME), not shown) may determine the LGW 110 as a mobility anchor of the UE 100. In this case, the UE 100 establishes a PDN connection by using the LGW 110 as a default GW. For example, the UE 100 may create a default PDN connection by anchoring to the LGW 110 according to a decision of the MME (not shown) at initial access or at handover. The anchoring to the LGW 110 may imply allocating an IP address IPUE1 by the LGW 110.

In addition, as shown in FIG. 1B, the UE 100 establishes a further PDN connection by using the PGW 130 in a state of being connected to a PDN via the LGW 110. For example, when a flow which requires IP session persistence is generated by the UE 100 in a state where the UE 100 has a PDN connection using the LGW 110, in order to support the flow which requires the IP session persistence, the UE 100 may request a network to establish a PDN connection using the PGW 130, and may create a further PDN connection for the same PDN by anchoring to the PGW 130. The anchoring to the PGW 130 may imply allocating a further IP address IPUE2 by the PGW 130. Accordingly, the UE 100 may perform communication by using the IP address IPUE1 allocated by the LGW 110 as to the flow which does not require the IP session persistence, and may perform communication by using the IP address IPUE2 allocated by the PGW 130 as to the flow which requires the IP session persistence.

After ending all flows which require the IP session persistence, the UE 100 disconnects the further PDN connection using the PGW 130, and maintains the PDN connection using the LGW 110. According to the exemplary embodiment of the present invention, after a pre-set delay period elapses from a time of ending all flows which require the IP session persistence, the UE 100 may disconnect the further PDN connection using the PGW 130. Although it is assumed in FIG. 1A and FIG. 1B that the LGW 110 exists in the same position as the Home eNodeB (HeNB), the LGW 110 and the SGW 120 may exist in the same position according to various exemplary embodiments of the present invention.

Figure 2A:
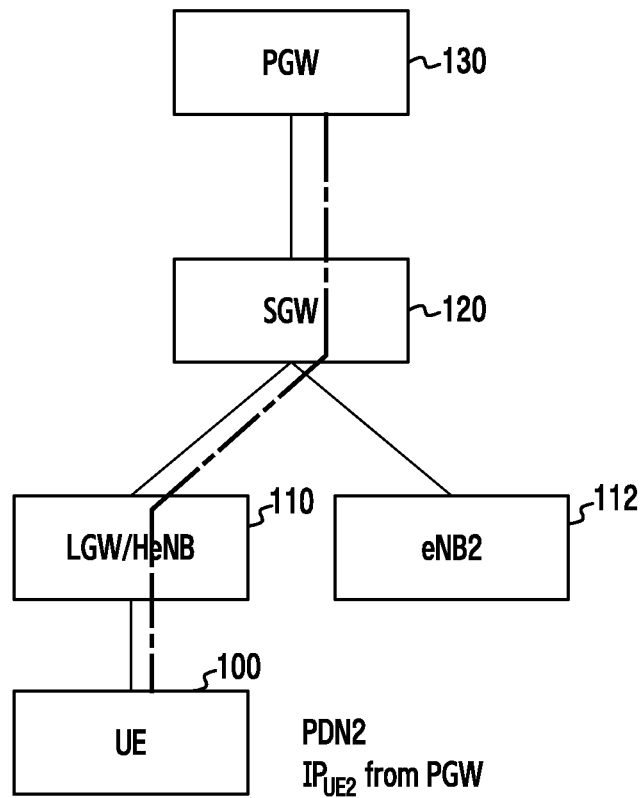
FIG. 2A and FIG. 2B illustrate on-demand dual anchoring according to another exemplary embodiment of the present invention.
Figure 2B:
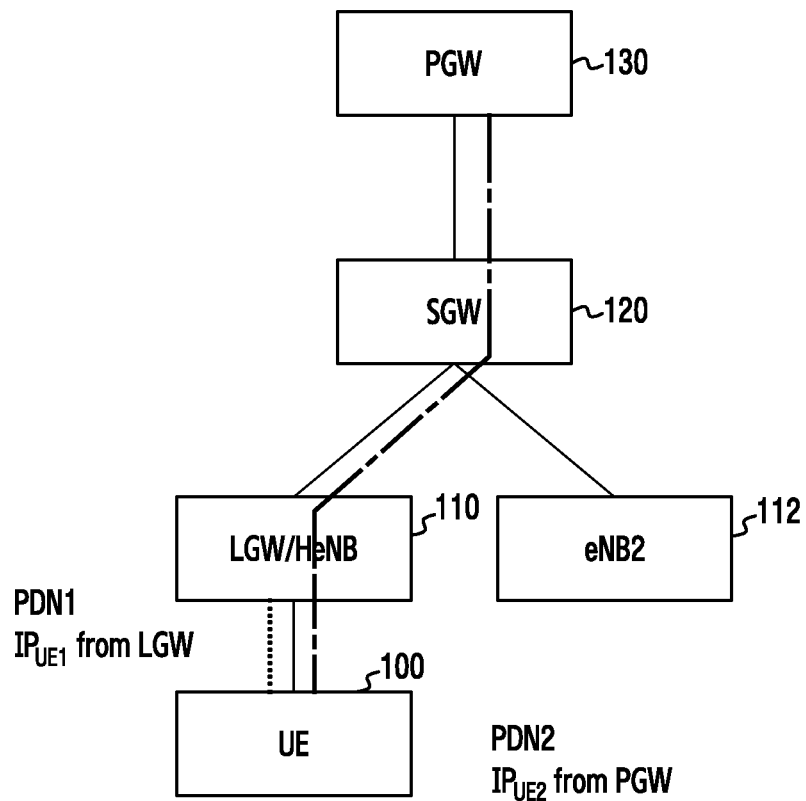

FIG. 2A and FIG. 2B illustrate on-demand dual anchoring according to another exemplary embodiment of the present invention. A wireless communication system according to the exemplary embodiment of the present invention may be configured to include a UE 100, an LGW/HeNB 110, an eNB 112, an SGW 120, and a PGW 130. In the following description, the LGW/HeNB 110 may be expressed by the LGW 110. The LGW 110 may imply only an LGW which exists in the same position as the HeNB, or may imply both of the LGW and the HeNB.

As shown in FIG. 2A, a network node (e.g., an MME (not shown)) may determine the PGW 130 as a mobility anchor of the UE 100. In this case, the UE 100 establishes a PDN connection by using the PGW 130 as a default GW. For example, the UE 100 may create a default PDN connection by anchoring to the PGW 130 according to a decision of the MME (not shown) at initial access or at handover. The anchoring to the PGW 130 may imply allocating of an IP address IPUE2 by the PGW 130.

In addition, as shown in FIG. 2B, the UE 100 establishes a further PDN connection by using the LGW 110 in a state of being connected to a PDN via the PGW 130. For example, when a flow which does not require IP session persistence is generated by the UE 100 in a state where the UE 100 has a PDN connection using the PGW 130, in order to support the flow which does not require the IP session persistence, the UE 100 may request a network to establish a PDN connection using the LGW 110, and may create a further PDN connection for the same PDN by anchoring to the LGW 110. The anchoring to the LGW 110 may imply allocating a further IP address IPUE1 by the LGW 110. Accordingly, the UE 100 may perform communication by using the IP address IPUE1 allocated by the LGW 110 as to the flow which does not require the IP session persistence, and may perform communication by using the IP address IPUE2 allocated by the PGW 130 as to the flow which requires the IP session persistence.

After all flows which do not require the IP session persistence end, the UE 100 disconnects the further PDN connection using the LGW 110, and maintains the PDN connection using the PGW 130. In this case, after a pre-set delay period elapses from a time of ending the flows which do not require the IP session persistence, the UE 100 may disconnect the further PDN connection using the LGW 110. Although it is assumed in FIG. 2A and FIG. 2B that the LGW 110 exists in the same position as the HeNB, the LGW 110 and the SGW 120 may exist in the same position according to various exemplary embodiments of the present invention.

Although it has been described above with reference to FIG. 1A to FIG. 2B by taking dual anchoring for example, the aforementioned exemplary embodiments of the present invention are not limited thereto, and thus may also be equally applied to a multi-anchoring case.

Figure 3:
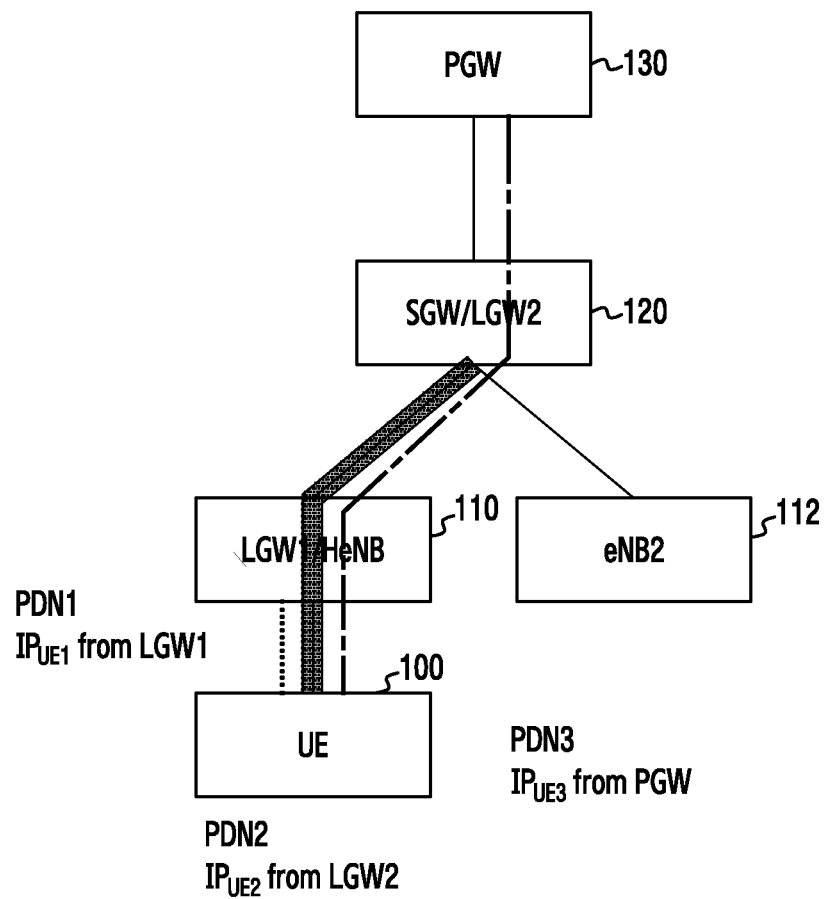
FIG. 3 illustrates permanent multi-anchoring according to another exemplary embodiment of the present invention.

FIG. 3 illustrates permanent multi-anchoring according to another exemplary embodiment of the present invention. A wireless communication system according to the exemplary embodiment of the present invention may be configured to include a UE 100, an LGW/HeNB 110, an eNB 112, an SGW 120, and a PGW 130. In the following description, the LGW/HeNB 110 may be expressed by the LGW 110. The LGW 110 may imply only an LGW which exists in the same position as the HeNB, or may imply both of the LGW and the HeNB.

Referring to FIG. 3, a network node (e.g., an MME (not shown)) may determine the LGWs 110 and 120 and the PGW 130 as mobility anchors of the UE 100. For example, the UE 100 may create several connections for the same PDN by allocating IP addresses IPUE1, IPUE2, and IPUE3 by each of at least one of the LGWs 110 and 120 and the PGW 130 according to a decision of the MME (not shown) at initial access or at handover. For example, at the initial access or at the handover, the UE 100 may create two PDN connections by allocating the IP addresses IPUE1 and IPUE3 by each of the LGW1 110 and the PGW 130, and may create two PDN connections by allocating the IP addresses IPUE2 and IPUE3 by each of the LGW2 110 and the PGW 130. For another example, at the initial access or at the handover, the UE 100 may create three PDN connections by allocating the IP addresses IPUE1, IPUE2, and IPUE3 by each of the LGW1 110 which exists in the same position as the HeNB, the LGW2 120 which exists in the same position as the SGW, and the PGW 130. Accordingly, the UE 100 may perform communication by using the IP address IPUE3 allocated by the PGW 130 as to a flow which requires IP session persistence, and may perform communication by using the IP address IPUE1 or IPUE2 allocated by the LGW 110 as to a flow which does not require the IP session persistence. However, if handover occurs due to a positional movement of the UE 100 in case of supporting permanent dual anchoring using the LGW 110 and the PGW 130, the LGW 110 corresponding to the moved position may not exist. In this case, after the handover, the UE 100 may maintain only a PDN connection using the PGW 130. Therefore, if only the PDN connection using the PGW 130 is maintained after the handover, the UE 100 will perform communication by using the IP address IPUE3 allocated by the PGW 130 as to all flows. If the LGW 110 corresponding to the moved position is discovered when the handover occurs due to the positional movement of the UE 100, the UE 100 may establish two PDN connections using the LGW 110 and the PGW 130.

In FIG. 1A to FIG. 3 described above, the UE 100 may create the PDN connection by using three types of GWs. For example, the PDN connection may be created by using each of the first-type LGW 110 which exists in the same position as the HeNB, the second-type LGW 120 which exists in the same position as the SGW 120, and the third-type PGW 130 which exists in the center of the PDN network. The first PDN connection using the first-type LGW 110 has a short data path, but may be vulnerable to an IP session disconnection due to an IP address change of the UE 100. Further, the third PDN connection using the third-type PGW 130 has strong IP session persistence, but disadvantageously has a long data path. Furthermore, the second PDN connection using the second-type LGW 120 may be characterized in that its data path is longer than that of the first PDN connection but is shorter than that of the third PDN connection, and that its IP session persistence is weaker than that of the third PDN connection but is stronger than that of the first PDN connection. Therefore, according to the exemplary embodiment of the present invention, the first PDN connection, the second PDN connection, and the third PDN connection may be selectively used by considering whether a flow generated by the UE requires IP session persistence.

Figure 4:
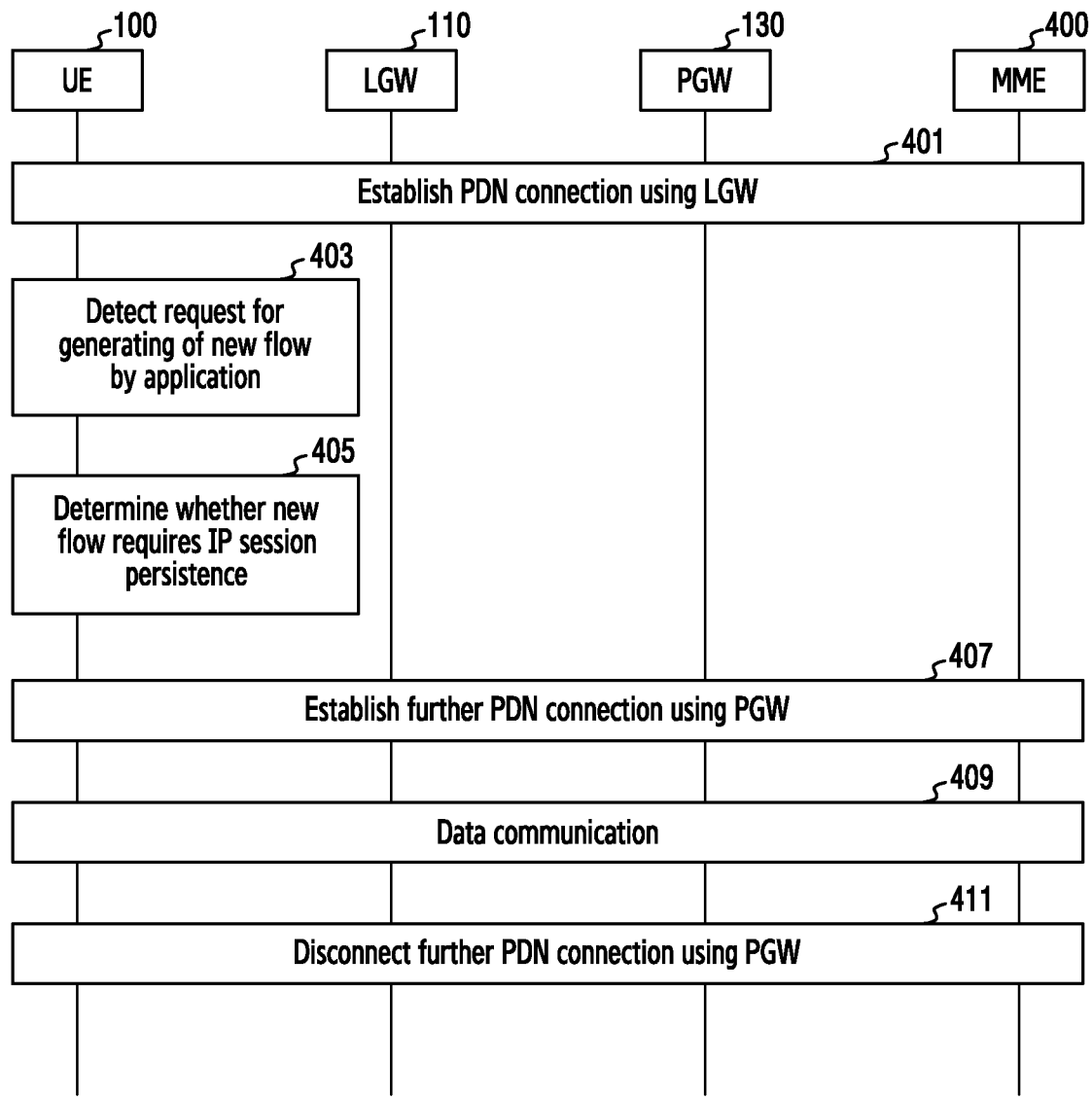
FIG. 4 illustrates a signal flow of on-demand dual anchoring in a wireless communication system according to an exemplary embodiment of the present invention.
Figure 5:
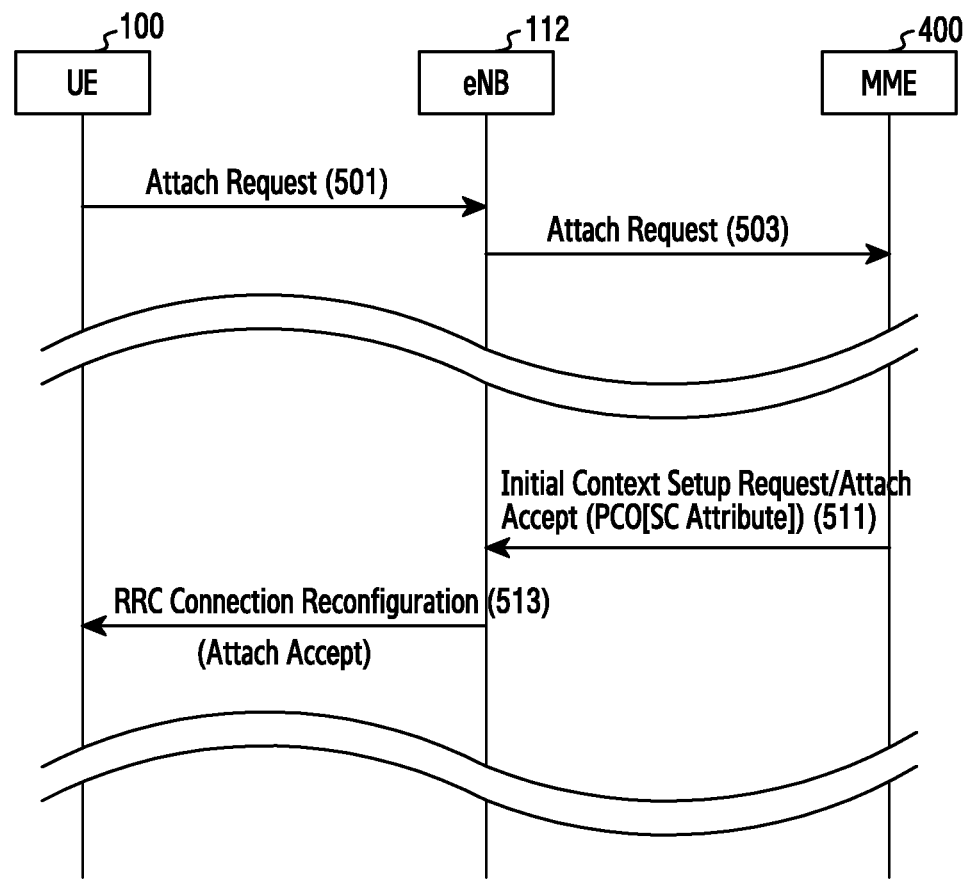
FIG. 5 illustrates a schematic signal flow for transmitting, by a network to a User Equipment (UE), attribute information indicating whether session persistence is supported for a Packet Data Network (PDN) GateWay (GW) of the UE at initial access of the UE according to an exemplary embodiment of the present invention.
Figure 6:
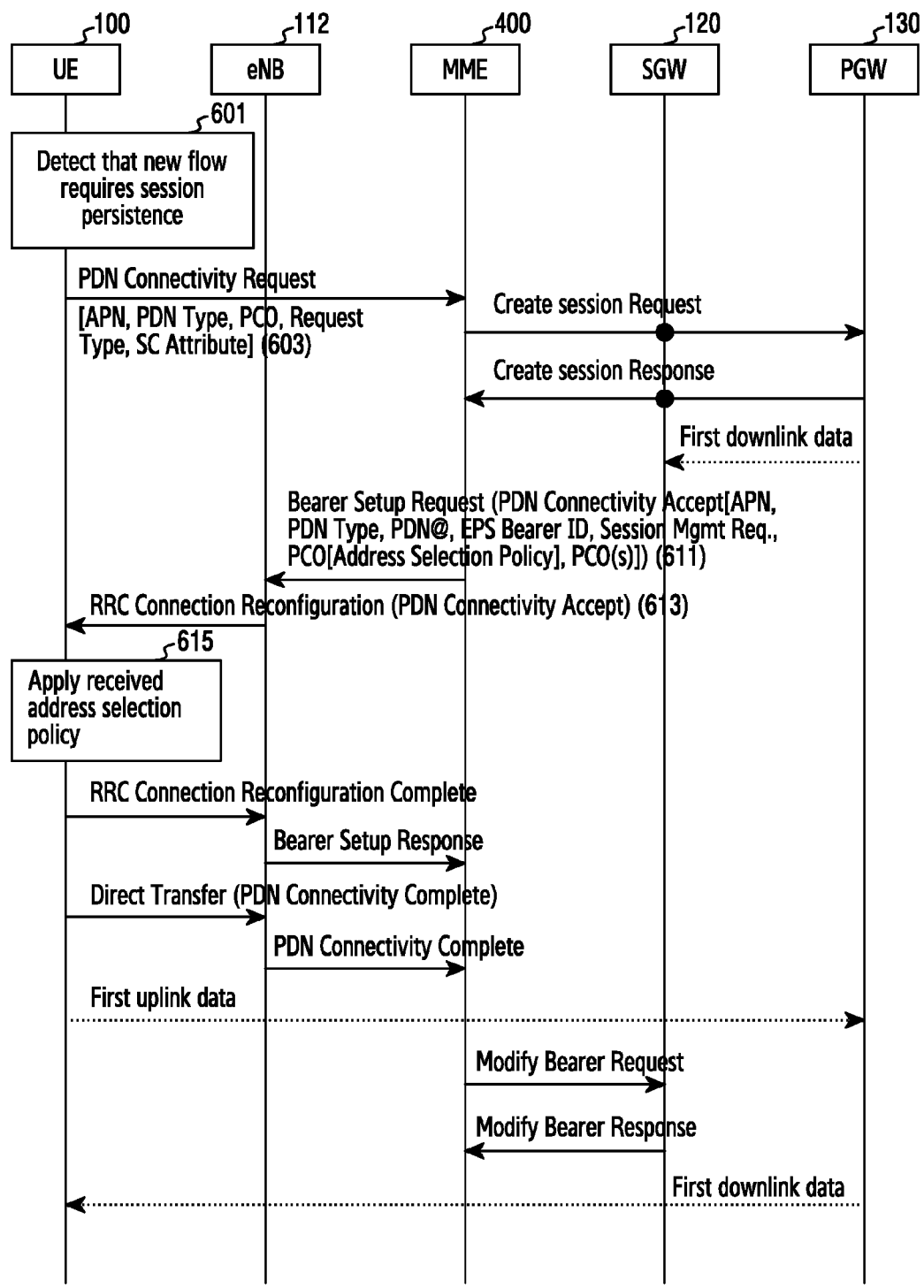
FIG. 6 illustrates a signal flow for transmitting, by a network to a UE, an address selection policy indicating whether session persistence is supported for a corresponding PDN GW when a PDN connection of the UE is made according to an exemplary embodiment of the present invention.

Hereinafter, for convenience of explanation, FIG. 4 to FIG. 6 are described by assuming a case where the UE 100 establishes a PDN connection by using the LGW 110 as a default mobility anchor, and a further PDN connection is established by using the PGW 130 upon detecting of a new flow, which requires IP session persistence, generated by the UE 100. However, exemplary embodiments of FIG. 4 to FIG. 6 may also be equally applied to a case where the UE 100 establishes the PDN connection by using the PGW 130 as the default mobility anchor, and establishes the further PDN connection by using the LGW 110 upon detecting generation of a new flow which does not require the IP session persistence.

FIG. 4 illustrates a signal flow of on-demand dual anchoring in a wireless communication system according to an exemplary embodiment of the present invention.

Referring to FIG. 4, the UE 100 establishes a PDN connection using the LGW 110 in step 401. For example, the UE 100 may create the PDN connection by using the LGW 110 determined as a default mobility anchor. According to the exemplary embodiment of the present invention, the default mobility anchor may be determined on the basis of whether applications frequently used by the UE 100 require IP session persistence, or may be determined on the basis of a user configuration or an operation policy. For example, if the applications frequently used by the UE 100 do not require the IP session persistence, the LGW 110 may be determined as the default mobility anchor. For another example, if the applications frequently used by the UE 100 require the IP session persistence, a PGW may be determined as the default mobility anchor. For another example, the LGW 110 may be determined as the default mobility anchor by a user input of the UE 100, or the LGW 110 may be determined as the default mobility anchor by an operator policy.

After establishing the PDN connection using the LGW 110, the UE 100 detects a request for generating of a new flow by an application in step 403, and determines whether the new flow requested to be generated requires IP session persistence, and determines that a further PDN connection using the PGW 130 is required in step 405. For example, if the new flow requested by the application requires the IP session persistence, the UE 100 may determine that the further PDN connection using the PGW 130 is required. According to the exemplary embodiment, whether the new flow requires the IP session persistence may be determined by using an identifier of the application, a type of the application, a feature of the application, a destination port number, a destination IP address, or the like. For example, if the destination port number of the new flow is a TCP port 22, it may be determined that the flow requires the IP session persistence.

The UE 100 may establish the further PDN connection using the PGW 130 in step 407, and may perform data communication by using a corresponding flow in step 409. For example, the UE 100 may transmit/receive data by selecting an IP address allocated by the PGW 130 as a source IP address of the flow. Although not shown, according to various exemplary embodiments of the present invention, if the flow does not require the IP session persistence, the UE 100 may omit step 407, and may transmit/receive data by selecting an IP address allocated by the LGW 110 as the source IP of the flow.

Thereafter, in step 411, the UE 100 disconnects the further PDN connection using the PGW 130. For example, after all flows which require the IP session persistence end, the UE 100 may disconnect the further PDN connection using the PGW 130. According to the exemplary embodiment, when a pre-set delay period (or a threshold period) expires from a time of ending all flows which require the IP session persistence, the UE 100 may disconnect the further PDN connection using the PGW 130. This is for preparing a case where flows which require the IP session persistence are generated again immediately after all flows which require the IP session persistence end. For example, the UE 100 may wait instead of disconnecting the further PDN using the PGW 130 during the pre-set delay period from the time of ending all flows which require the IP session persistence, thereby preventing the further PDN connection using the PGW 130 from being performed again when a flow which requires the IP session persistence is generated within the delay period.

FIG. 5 illustrates a schematic signal flow for transmitting, by a network to the UE 100, attribute information indicating whether session persistence is supported for a PDN GW of the UE 100 at initial access of the UE 100 according to an exemplary embodiment of the present invention. The initial access of the UE 100 according to the exemplary embodiment of the present invention is performed according to a procedure defined in a 3GPP standard. However, the initial access procedure of the UE 100 according to the exemplary embodiment of the present invention may be different from the procedure defined in the standard in a sense that a network node transmits to the UE attribute information indicating whether a PDN connection of the UE 100 supports IP session persistence. Therefore, FIG. 5 according to the exemplary embodiment of the present invention is illustrated and described focusing on an aspect that the network node transmits the attribute information regarding the PDN connection of the UE 100 to the UE at the initial access of the UE 100, and other procedures performed in the same manner as the standard are omitted.

Referring to FIG. 5, the UE 100 transmits an attach request message to the eNB 112 for initial access in step 501, and the eNB 112 delivers to an MME 400 the attach request message received from the UE 100 in step 503. Thereafter, although not shown, the UE 100, the eNB 112, and the MME 400 may perform procedures for the initial access of the UE 100 (e.g., an authentication procedure, a position update procedure, a procedure of selecting a GW which will operate as a mobility anchor of the UE, a procedure of creating a session for the selected GW, or the like) according to the procedure defined in the standard. According to the exemplary embodiment, a type of the GW which will operate as the mobility anchor of the UE 100 may be determined by a pre-set operator policy, or may be determined by a user configuration of the UE 100. For another example, the MME 400 may determine the type of the GW which will operate as the mobility anchor of the UE 100 on the basis of whether applications frequently used by the UE 100 require the IP session persistence. According to various exemplary embodiments, the MME 400 may receive information regarding a type of a GW preferred by the UE 100 as the mobility anchor from the UE 100. Among GWs corresponding to the determined GW type, the MME 400 may determine a GW closest to a position of the UE 100 as the mobility anchor of the UE 100.

In step 511, the MME 400 transmits an initial context setup request message including an attach accept message to the eNB 112. According to the exemplary embodiment of the present invention, the attach accept message may include a Protocol Configuration Option (PCO), and the PCO may include attribute information indicating whether the GW determined as the mobility anchor of the UE 100 supports the IP session persistence. For example, if the GW determined as the mobility anchor of the UE 100 is the first-type LGW 110 which exists in the same position as the HeNB, the attribute information may indicate that the IP session persistence is not supported. For another example, if the GW determined as the mobility anchor of the UE 100 is the third-type PGW 130 which exists in the center of the PDN network, the attribute information may indicate that the IP session persistence is supported. For another example, if the GW determined as the mobility anchor of the UE 100 is the second-type LGW 120 which exists in the same position as the SGW, the attribute information may indicate that the IP session persistence is partially supported. For another example, if the GW determined as the mobility anchor of the UE 100 is the LGW, irrespective of whether the LGW exists in the same position as the HeNB or exists in the same position as the SGW, the attribute information may indicate that the IP session persistence is not supported. In addition, the attach accept message according to the exemplary embodiment of the present invention may include other attribute information related to the GW determined as the mobility anchor of the UE 100. Further, the attach accept message according to the exemplary embodiment of the present invention may further include attribute information regarding at least one different GW belonging to the same PGN, in order to achieve a further PDN connection of the UE 100 for the same PDN. Further, the attach accept message may further include identification information of the GW (e.g., an IP address of the GW). As defined in the standard, the attach accept message according to the exemplary embodiment of the present invention may further include an APN, a GUTI, a PDN type, a TAI list, an EPS bearer identifier, a session management request, a PCO, a NAS sequence number, an NAC-MAC, information indicating whether IMS voice is supported through a PS session, information indicating whether ES is supported, information indicating whether LCS is supported, or the like.

The eNB 112 acquires the attach accept message from the initial context setup request message received from the MME 400, and in step 513, transmits an RRC connection reconfiguration message including the acquired attach accept message to the UE 100. Accordingly, the UE 100 may confirm whether a GW which performs a mobility anchor function of the UE 100 supports the IP session persistence from the attach accept message included in the RRC connection reconfiguration message, and on the basis of the confirmation result, may determine whether a further PDN connection is required for a new flow which is generated by the UE 100. For example, the UE 100 may confirm that the GW which performs its mobility anchor function does not support the IP session persistence from the attach accept message, and if the new flow requires the IP session persistence, may determine a situation of requiring the further PDN connection using the PGW 130 which supports the IP session persistence. For another example, the UE 100 may confirm that the GW which performs its mobility anchor function does not support the IP session persistence from the attach accept message, and if the new flow does not require the IP session persistence, may determine a situation of not requiring the further PDN connection. For another example, the UE 100 may confirm a situation where the GW which performs its mobility anchor function supports the IP session persistence from the attach accept message, and if the new flow requires the IP session persistence, may determine a situation of requiring the further PDN connection. For another example, the UE 100 may confirm a situation where the GW which performs its mobility anchor function supports the IP session persistence from the attach accept message, and if it is a situation where the new flow does not require the IP session persistence, may determine a situation of requiring a further PDN connection using the LGW 110 and/or 120. In this case, the UE 100 may use other GWs' attribute information included in the attach accept message to confirm whether there is a GW not supporting the IP session persistence among GWs belonging to a corresponding PDN, and may determine whether there is a further PDN connection on the basis of the confirmation result. For example, even though the situation of requiring the further PDN connection using the LGW 110 and/or 120 is detected, if the GW not supporting the IP session persistence does not exist in a corresponding PDN as a result of confirming the other GWs' attribute information included in the attach accept message, the UE 100 may not perform a procedure for creating a further PDN connection.

FIG. 6 illustrates a signal flow for transmitting, by a network to a UE, an address selection policy indicating whether session persistence is supported for a corresponding PDN GW when a PDN connection of the UE 100 is made according to an exemplary embodiment of the present invention. The PDN connection of the UE 100 according to the exemplary embodiment of the present invention is performed on the basis of a procedure defined in a 3GPP procedure. Therefore, only a signal or operation changed according to the exemplary embodiment of the present invention is described in detail, and descriptions on other signals and operates will be omitted. A case where the UE 100 is aware of attribute information of a GW operating as a mobility anchor of the UE 100 and an availability of other GWs is assumed in FIG. 6 according to the exemplary embodiment of the present invention.

Referring to FIG. 6, the UE 100 detects that a new flow requires session persistence in step 601. For example, the UE 100 may determine whether the new flow requires the IP session persistence by using information such as an identifier of an application corresponding to the new flow, a type of the application, a feature of the application, a destination port number, a destination IP address, or the like.

In step 603, the UE 100 transmits a PDN connectivity request message including attribute information regarding the PDN connection to the MME 400, and thus requests to create a further PDN connection. The attribute information regarding the PDN connection may indicate that the PDN connection further requested by the UE 100 needs to satisfy corresponding attribute information. For example, the attribute information regarding the further PDN connection may indicate that the IP session persistence is required or the IP session persistence is not required. If the attribute information regarding the further PDN connection indicates that the IP session persistence is required, it may imply that the UE 100 requests for the PDN connection supporting the IP session persistence. On the other hand, if the attribute information regarding the PDN connection indicates that the IP session persistence is not required, it may indicate that the UE 100 requests for the PDN connection not supporting the IP session persistence. According to another exemplary embodiment of the present invention, the PDN connectivity request message may deliver identification information of a GW to be used as a further mobility anchor, instead of the attribute information regarding the PDN connection. For example, in a case where the UE 100 has acquired information of GWs belonging to the same PDN (e.g., each GW's identification information and attribute information indicating whether each GW supports IP session persistence) in the initial access procedure as shown in FIG. 5, the UE 100 may select a GW according to whether a new flow requires IP session persistence, and may transmit the PDN connectivity request message including identification information of the selected GW so as to request for creating of a further PDN connection by using the GW. In addition, as defined in the standard, the PDN connectivity request message may further include an APN, a PDN type, a PCO, request type information, or the like. For convenience of explanation, it is assumed in the description of FIG. 6 that attribute information indicating a request for a PDN connection supporting IP session persistence is included in the PDN connectivity request message received by the MME 400 from the UE 100. Accordingly, the MME 400 may perform a session creation procedure by selecting the PGW 130 as a further mobility anchor of the UE 100, and by transmitting/receiving a creation session request message and creation session response message with respect to the selected PGW 130 via the SGW 120. However, according to another exemplary embodiment, if there is no GW corresponding to a GW identifier or attribute information included in the PDN connectivity request message received from the UE 100, the MME 400 may transmit a code indicating a PDN connection failure, and may end the procedure according to the exemplary embodiment of the present invention.

According to the exemplary embodiment of the present invention, in step 611, the MME 400 transmits a bearer setup request message to the eNB 112. According to the exemplary embodiment, the bearer setup request message includes a PDN connectivity accept message, and the PDN connectivity accept message may include a PCO including an address selection policy for an IP address allocated by a GW used in a further PDN connection of the UE 100. For example, the address selection policy may indicate a relation between an IP address allocated by the GW and whether IP session persistence is supported. Specifically, for example, the address selection policy may indicate that an IP address allocated by the PGW 130 can be used for a flow which requires IP session persistence. For another example, the address selection policy may indicate that an IP address allocated by the LGW 110 can be used for a flow which does not require the IP session persistence. In addition, the PDN connectivity accept message according to the exemplary embodiment of the present invention may include an address selection policy regarding IP addresses of GWs which are currently in use in a PDN connection of the UE 100, that is, other GWs which have been operating as a mobility anchor of the UE 100 even before the UE 100 further requests the PDN connection. For example, if a further PDN connection using the PGW 130 is created in a situation where the default mobility anchor of the UE 100 is the LGW 110, an address selection policy for an IP address of the LGW 110 may be modified from "being usable for all flows" to "being usable for a flow not requiring IP session persistence". Therefore, in the exemplary embodiment of the present invention, the MME 400 may transmit a PDN connectivity accept message including modified address selection information for the IP address of the GW which is currently operating as the mobility anchor of the UE 100. According to the exemplary embodiment, if the address selection policy for an IP address of a specific GW is not included in the PDN connectivity accept message, this may imply that the IP address of the specific GW can be used for any flow irrespective of the IP session persistence. Further, the PDN connectivity accept message may include EPS Bearer identifier information.

Upon receiving the bearer setup request message according to the exemplary embodiment of the present invention, the eNB 112 acquires the PDN connectivity accept message from the bearer setup request message, and in step 613, transmits an RRC connection reconfiguration message including the PDN connectivity accept message to the UE 100.

Thereafter, in step 615, the UE 100 may acquire an address selection policy for a GW which is a mobility anchor of a further PDN connection from the PDN connectivity accept message included in the RRC connection reconfiguration message, and may store the acquired address selection policy by associating with an IP address allocated by the GW. For example, the UE 100 may analyze the RRC connection reconfiguration message to acquire an address selection policy for an IP address allocated by the PGW 130 which is a mobility anchor of a further created PDN connection, and may apply the acquired address selection policy to an address selection rule of an IP stack. In addition, the UE 100 may acquire a modified address selection policy for at least one different GW which is currently operating as a mobility anchor from the PDN connectivity accept message, and may store the acquired address selection policy by associating with an IP address allocated by the GW. Accordingly, when selecting a source IP for a flow, the UE 100 may select a source IP address by considering an address selection policy associated with each IP address allocated by GWs which are mobility anchors of the UE 100.

According to various exemplary embodiments of the present invention, if a further PDN connection using the PGW 130 is established by creating a new flow which requires IP session persistence in a situation where a default mobility anchor is the LGW 110, the UE 100 may disconnect the further PDN connecting using the PGW 130 upon detecting a situation where the new flow which requires the IP session persistence ends and there is no other flows requiring the sessions persistence. In this case, the UE 100 may delete the IP address allocated by the PGW 130, and may initialize the address selection policy for the IP address allocated by the LGW 110. For example, since this is a situation where the further PDN connection using the PGW 130 is disconnected and thus the IP address allocated by the PGW 130 cannot be used and only the IP address allocated by the LGW 110 can be used, the UE 100 may modify the address selection policy such that the IP address allocated by the LGW 110 can be used for all of any flows irrespective of the IP session persistence. For example, the UE 100 may delete a restriction related to the IP session persistence as to the IP address allocated by the LGW 110.

Figure 7A:
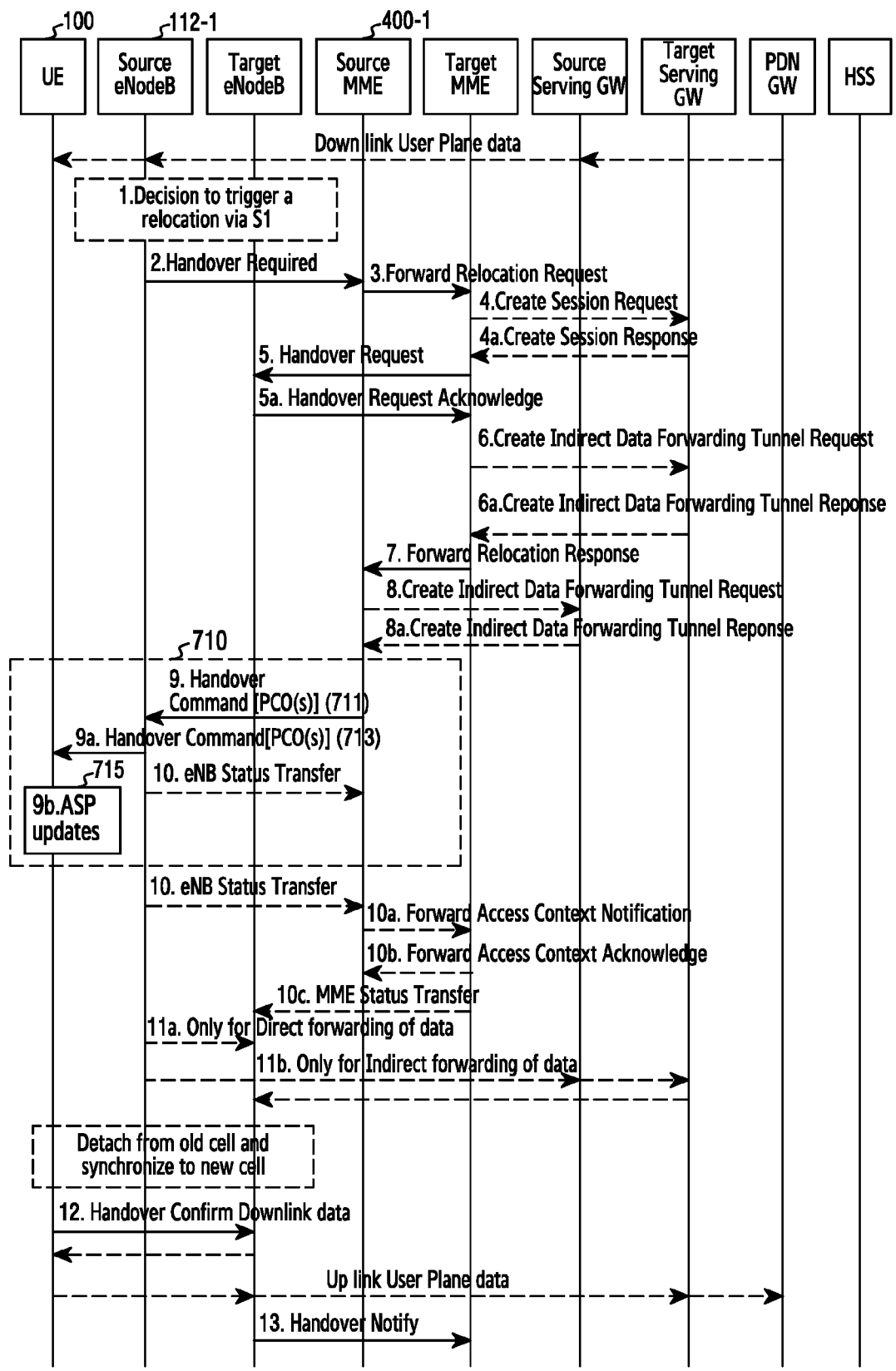
FIG. 7A and FIG. 7B illustrate a signal flow for transmitting, by a network to a UE, address selection policy information for a PDN GW at Si handover according to an exemplary embodiment of the present invention.
Figure 7B:
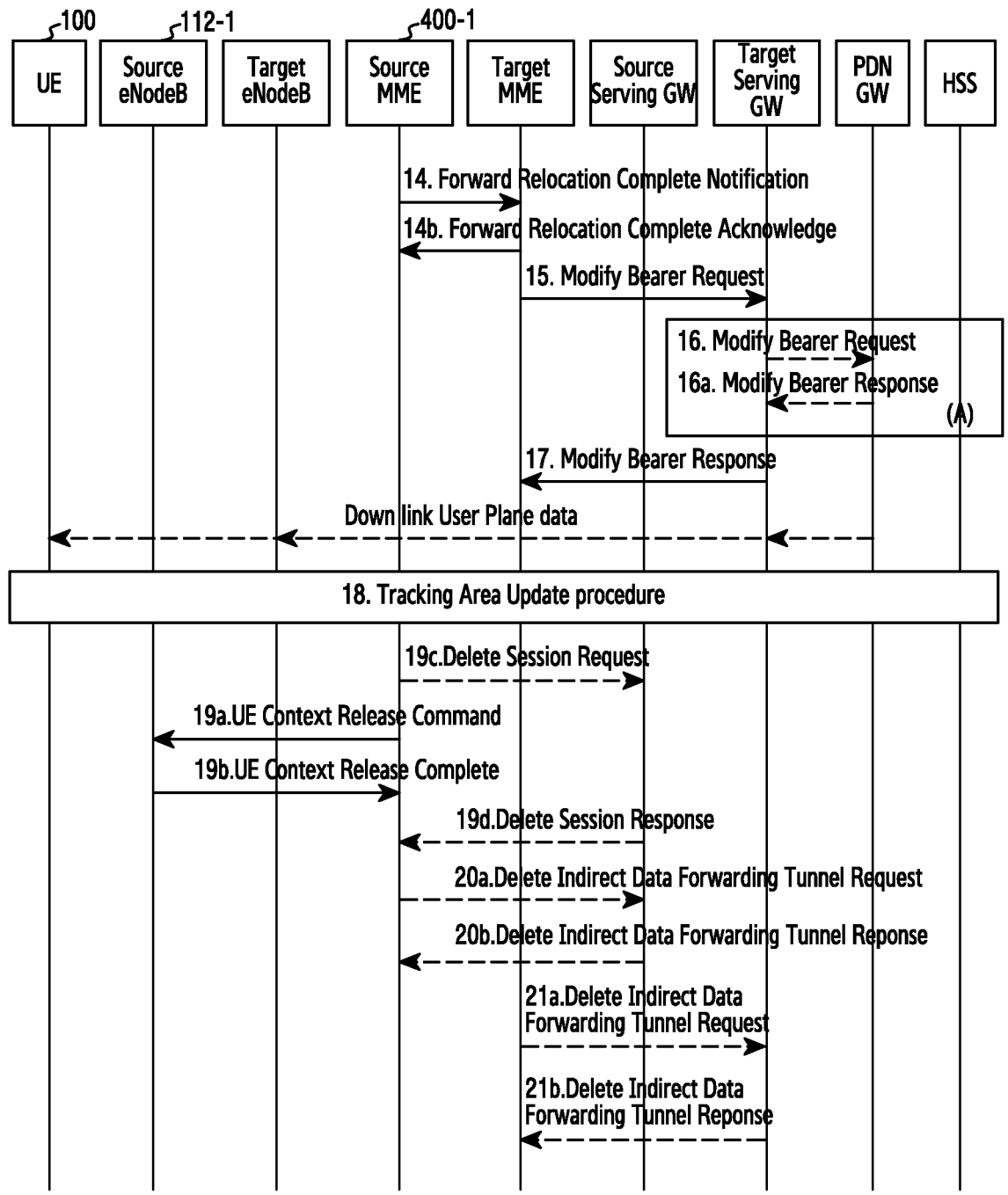

FIG. 7A and FIG. 7B illustrate a signal flow for transmitting, by a network to a UE, address selection policy information for a PDN GW at Si handover according to an exemplary embodiment of the present invention. An Si handover procedure of the UE 100 according to the exemplary embodiment of the present invention is performed on the basis of a procedure defined in a 3GPP standard. Therefore, only a signal or operation changed according to the exemplary embodiment of the present invention is described in detail, and descriptions on other signals and operates will be omitted.

It is assumed in FIG. 7A and FIG. 7B that the UE 100 establishes two or more PDN connections by using different types of GWs as to the same PDN. For example, for convenience of explanation, a case where the UE 100 establishes two PDN connections by using the LGW 110 and the PGW 130 as to the same PDN is assumed in the description of FIG. 7A and FIG. 7B. However, the exemplary embodiment of FIG. 7A and FIG. 7B described below is not limited thereto, and thus may also be equally applied to all cases of establishing two or more PDN connections using different GWs. For example, it may also be applied to a case where the UE 100 establishes two PDN connections by using the LGW 110 which exists in the same position as the HeNB and the LGW 120 which exists in the same position as the SGW as to the same PDN.

According to the exemplary embodiment of the present invention, one PDN connection using the specific LGW 110 may end due to the Si handover of the UE 100, and only one PDN connection using the PGW 130 may be maintained. In this case, the MME 400 may detect that one PDN connection using the LGW 110 is deleted and only one PDN connection using the PGW 130 is maintained for the UE 100, and may modify an address selection policy for the remaining PDN connection. For example, as indicated by a block 710 of FIG. 7A, a handover command message may be used to modify the address selection policy for the remaining PDN connection. More specifically, a source MME 400-1 may detect that one PDN connection using the LGW 110 ends and one PDN connection using the PGW 130 is maintained between two PDN connections for the UE 100 due to the handover of the UE 100, and in step 711, may transmit the handover command message including a modified address selection policy for the PGW 130. For example, the source MME 400-1 may modify the address selection policy for the PGW 130 from "being usable for a flow requiring IP session persistence" to "being usable for all flows", and may transmit the handover command message including the modified address selection polity to a source eNodeB 112-1. In step 713, the source eNodeB 112-1 may deliver to the UE 100 the handover command message received from the source MME 400-1.

In step 715, the UE 100 may receive an address selection policy of the PGW 130 from the received handover command message, and may store the received address selection policy by associating with the IP address allocated by the PGW 130. According to the exemplary embodiment, the UE 100 may analyze the handover command message, and thus may confirm that the PDN connection for the LGW 110 is disconnected due to the handover.

According to another exemplary embodiment of the present invention, although one PDN connection using the LGW 110 may end due to the Si handover of the UE 100, a new LGW which can be utilized by the UE may be discovered together. In this case, the MME 400 may transmit at least one of an address selection policy and attribute information regarding the newly discovered LGW. For example, as indicated by a block 710 of FIG. 7A, at least one of an address selection policy and attribute information regarding a new LGW may be transmitted by using the handover command message. More specifically, the source MME 400-1 may detect the new LGW which can be utilized by the UE 100 due to the handover of the UE 100, and in step 711, may transmit the handover command message including an address selection policy for a new LGW and/or attribute information indicating whether the new LGW supports IP session persistence. In step 713, a source eNodeB 112-1 may deliver to the UE 100 the handover command message received from the source MME 400-1.

In step 715, the UE 100 may store and utilize the attribute information and/or address selection policy of the new LGW, which are acquired from the received handover command message.

Figure 8:
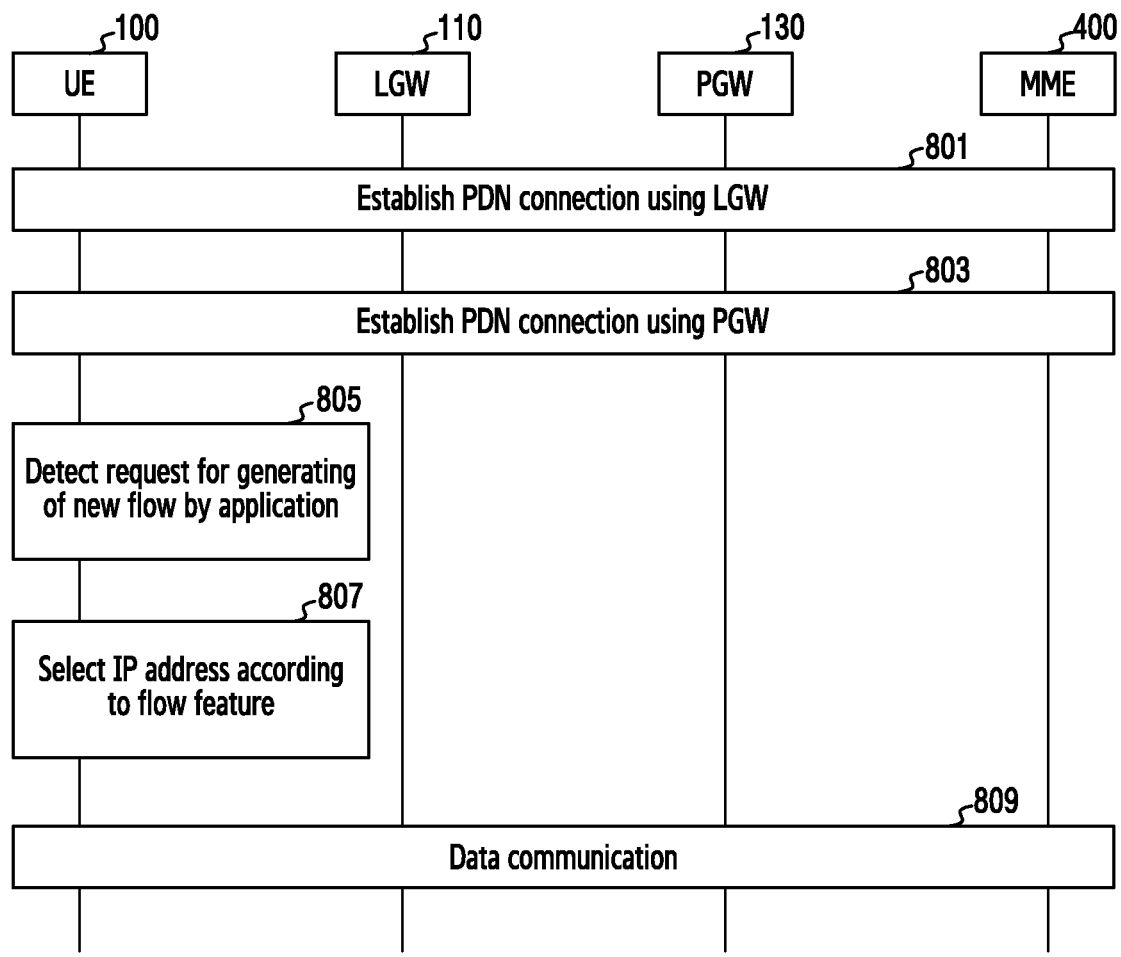
FIG. 8 illustrates a signal flow of permanent dual anchoring in a wireless communication system according to an exemplary embodiment of the present invention.

FIG. 8 illustrates a signal flow of permanent dual anchoring in a wireless communication system according to an exemplary embodiment of the present invention.

Referring to FIG. 8, a UE 100 establishes a PDN connection by using an LGW 110 in step 801, and establishes a PDN connection by using a PGW 130 in step 803.

Thereafter, the UE 100 detects a request for generating of a new flow by an application in step 805, and determines an IP address on the basis of whether the new flow requested to be generated requires IP session persistence in step 807. For example, if the new flow requested by the application requires the IP session persistence, the UE 100 may select an IP address allocated by the PGW 130 supporting the IP session persistence as a source IP. For another example, if the new flow requested by the application does not require the IP session persistence, the UE 100 may select an IP address allocated by the LGW 110 not supporting the IP session persistence as the source IP. According to the exemplary embodiment, whether the new flow requires the IP session persistence may be determined by using an identifier of the application, a type of the application, a feature of the application, a destination port number, a destination IP address, or the like. For example, if the destination port number of the new flow is a TCP port 22, it may be determined that the flow requires the IP session persistence.

Thereafter, in step 809, the UE 100 may transmit/receive data by using a selected IP address as the source IP address of the flow.

In FIG. 8, according to the exemplary embodiment of the present invention, the UE 100 may persistently maintain the PDN connection using the LGW 110 and the PDN connection using the PGW 130. However, if a specific-type GW cannot be utilized any more due to the handover of the UE 100, the UE 100 may disconnect the connection with the GW.

Further, the exemplary embodiments described with reference to FIG. 4 to FIG. 7B on the basis of the on-demand dual anchoring may also equally apply to permanent dual anchoring. For example, also in the permanent dual anchoring, the MME 400 may transmit, to the UE 100, attribute information regarding a GW operating as a mobility anchor of the UE 100 in an initial access procedure of the UE 100 and attribute information regarding other GWs which can be utilized by the UE 100. Further, the MME 400 may transmit, to the UE, address selection information regarding at least one GW operating as the mobility anchor of the UE when the UE establishes a PDN connection. Further, the MME 400 may transmit, to the UE, an address selection policy and/or information regarding a GW which is changed at handover.

Figure 9:
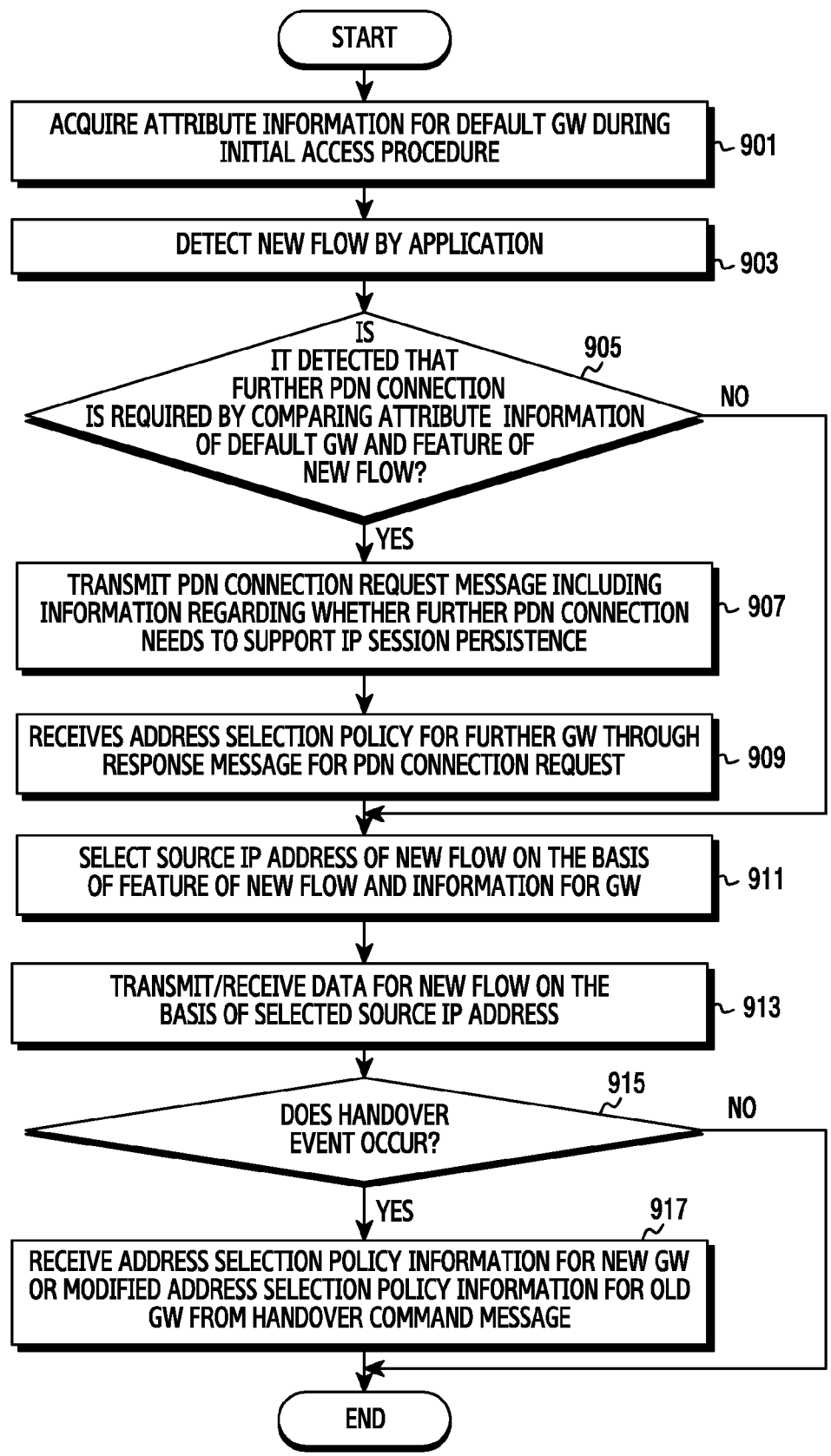
FIG. 9 illustrates an operational procedure for dual anchoring of a UE according to an exemplary embodiment of the present invention.

FIG. 9 illustrates an operational procedure for dual anchoring of a UE according to an exemplary embodiment of the present invention.

Referring to FIG. 9, in step 901, the UE 100 acquires attribute information for a default GW during an initial access procedure. For example, in an on-demand dual anchoring case, the UE 100 may acquire attribute information indicating whether a specific-type GW determined as its mobility anchor supports IP session persistence. For another example, in a permanent dual anchoring case, the UE 100 may acquire attribute information indicating whether a corresponding GW supports IP session persistence as to each of two or more different types of GWs determined as its mobility anchors. According to the exemplary embodiment of the present invention, the UE 100 may acquire an IP address to be used by the UE 100 from a default GW during the initial access procedure.

The UE 100 detects a new flow by an application in step 903, and determines whether it is detected that a further PDN connection is required by comparing a feature of the new flow and attribute information of a default GW in step 905. For example, if the new flow requires the IP session persistence and the default GW does not support the IP session persistence, the UE 100 may determine that the further PDN connection is required. For another example, if the new flow does not require the IP session persistence and the default GW supports the IP session persistence, the UE 100 may determine that the further PDN connection is required. For another example, if the new flow requires the IP session persistence and the default GW supports the IP session persistence, the UE 100 may determine that the further PDN connection is not required. According to the exemplary embodiment, whether the new flow requires the IP session persistence may be determined by using an identifier of an application corresponding to a flow, a type of the application, a feature of the application, a destination port number, a destination IP address, or the like. For example, if the destination port number of the new flow is a TCP port 22, it may be determined that the flow requires the IP session persistence. If it is determined that the further PDN connection is not required, the UE 100 may proceed to step 911 described below.

Meanwhile, when it is determined that the further PDN connection is required, in step 907, the UE 100 transmits to the network (e.g., the MME 400) a PDN connectivity request message including information regarding whether the further PDN connection needs to support IP session persistence. For example, if the new flow requires the IP session persistence, the UE 100 may transmit to the network the PDN connectivity request message including the information indicating that the further PDN connection needs to support the IP session persistence. For another example, if the new flow does not require the IP session persistence, the UE 100 may transmit to the network the PDN connectivity request message including information indicating that the further PDN connection does not need to support the IP session persistence.

In step 909, the UE 100 receives an address selection policy for a further GW through a response message for the PDN connectivity request. For example, the UE 100 may acquire a PDN connectivity accept message from an RRC connection reconfiguration message received in response to the PDN connectivity request, and may acquire address selection policy information regarding a GW which is used in a further PDN connection of the UE 100 from the PDN connectivity accept message. For example, the address selection policy may indicate a relation between an IP address allocated by the GW and whether IP session persistence is supported. Specifically, for example, the address selection policy may indicate that an IP address allocated by the PGW 130 can be used for a flow which requires IP session persistence. For another example, the address selection policy may indicate that an IP address allocated by the LGW 110 can be used for a flow which does not require the IP session persistence. In addition, the PDN connectivity accept message according to the exemplary embodiment of the present invention may include an address selection policy regarding an IP address of at least one different GW which is currently in use in a PDN connection of the UE 100, that is, a default GW which has been operating as a mobility anchor of the UE 100 even before the UE 100 requests the PDN connection. For example, if a further PDN connection using the PGW 130 is created in a situation where the default GW of the UE 100 is the LGW 110, an address selection policy for an IP address of the LGW 110 may be modified from "being usable for all flows" to "being usable for a flow not requiring IP session persistence". Therefore, in the exemplary embodiment of the present invention, the UE 100 may acquire modified address selection information for the IP address of the GW which is currently operating as the mobility anchor of the UE 100 from the PDN connectivity accept message. According to the exemplary embodiment, if the address selection policy for an IP address of a specific GW is not included in the PDN connectivity accept message, the UE 100 may interpret this as that the IP address of the specific GW can be used for any flow irrespective of the IP session persistence. According to the exemplary embodiment of the present invention, the UE 100 may acquire an IP address to be used by the UE 100 from a further GW through a procedure of establishing a further PDN connection.

In step 911, the UE 100 may select a source IP address of a new flow on the basis of a feature of the new flow and information of a GW. For example, if the new flow requires the IP session persistence, the UE 100 may confirm a GW supporting the IP session persistence on the basis of an address selection policy and/or attribute information of each GW corresponding to a PDN connection of the UE 100, and may select an IP address allocated by the confirmed GW as a source IP address of the new flow. Thereafter, in step 913, the UE 100 may transmit/receive data for the new flow on the basis of the selected source IP address.

In addition, in step 915, the UE 100 may detect whether a handover event occurs. If the handover event does not occur, the UE 100 may end the procedure according to the exemplary embodiment of the present invention.

On the other hand, if the handover event occurs, in step 917, the UE 100 may receive address selection policy information for a new GW or modified address selection policy information for an old GW from a handover command message. For example, upon discovering the new GW by an MME due to the handover of the UE 100, the UE 100 may acquire at least one of attribute information regarding the newly discovered GW (e.g., information indicating whether the new GW supports the IP session persistence) and address selection policy information from the handover command message. For another example, if one PDN connection using a specific-type GW ends due to the handover of the UE 100 and only one PDN connection using a different-type GW is maintained, the UE 100 may receive modified address selection policy information for the different-type GW of which the connection is maintained from the handover command message.

Thereafter, the UE 100 ends the procedure according to the exemplary embodiment of the present invention.

Although not shown in FIG. 9 described above, when a new flow ends, the UE 100 may disconnect the further PDN connection established for the new flow. For example, if the new flow using the further PDN connection ends and a pre-set delay period elapses from a time of ending the new flow, the UE 100 may disconnect the further PDN connection.

Figure 10:
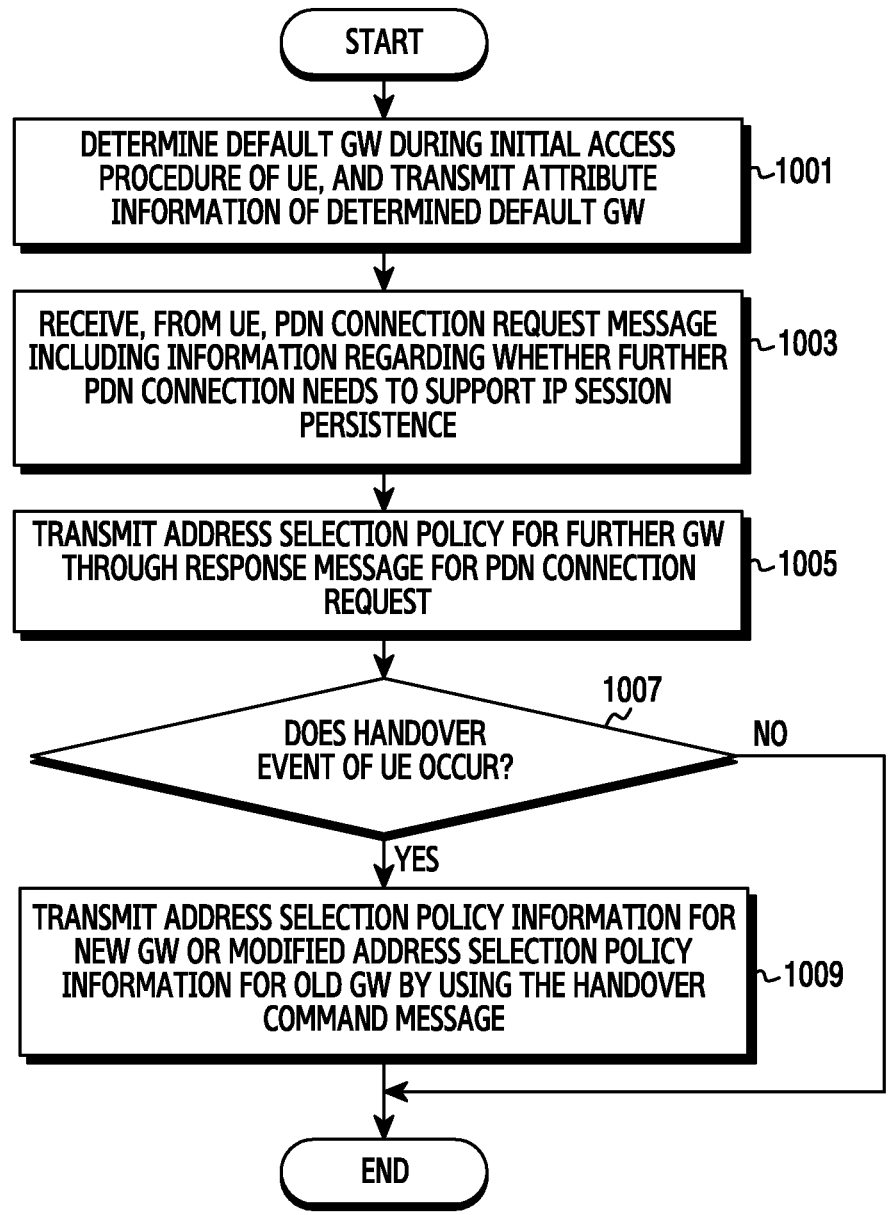
FIG. 10 illustrates an operational procedure of a Mobility Management Entity (MME) for dual anchoring of a UE according to an exemplary embodiment of the present invention.

FIG. 10 illustrates an operational procedure of an MME for dual anchoring of a UE according to an exemplary embodiment of the present invention.

Referring to FIG. 10, in step 1001, the MME 400 determines a default GW of the UE 100 during an initial access procedure of the UE 100, and transmits attribute information regarding the determined default GW to the UE 100. For example, in an on-demand dual anchoring case, the MME 400 may determine a type of the default GW of the UE 100 by considering whether applications frequently used by the UE require IP session persistence or by considering an operator policy, and may determine a GW closest to a position of the UE 100 among GWs corresponding to the determined type as the default GW of the UE 100. According to the exemplary embodiment, the MME 400 may receive information regarding a type of a GW preferred by the UE 100 as a mobility anchor from the UE 100, and may determine a default GW on the basis of the received preferred GW type information. For another example, in a permanent dual anchoring case, the MME 400 may determine two different-type GWs as default GWs of the UE 100.

Thereafter, in step 1003, the MME 400 receives from the UE 100 a PDN connectivity request message including information regarding whether a further PDN connection needs to support IP session persistence. According to the exemplary embodiment of the present invention, the MME 400 may determine a type of a GW for establishing a further PDN connection on the basis of the information regarding whether the further PDN connection needs to support the IP session persistence, and may determine a GW closest to a position of the UE 100 among GWs of the determined type as a further GW which will operate as a mobility anchor for the further PDN connection.

Thereafter, in step 1005, the MME 400 transmits an address selection policy for the further GW through a response message for the PDN connectivity request. For example, the MME 400 may transmit a PDN connectivity accept message including address selection policy information regarding a GW which is used for the further PDN connection of the UE 100. For example, the address selection policy information may indicate whether an IP address allocated by the GW supports IP session persistence. Specifically, for example, the address selection policy may indicate that an IP address allocated by the PGW 130 can be used for a flow which requires IP session persistence. For another example, the address selection policy may indicate that an IP address allocated by the LGW 110 can be used for a flow which does not require the IP session persistence. In addition, the PDN connectivity accept message according to the exemplary embodiment of the present invention may include an address selection policy regarding an IP address of at least one different GW which is currently in use in a PDN connection of the UE 100, that is, a default GW which has been operating as a mobility anchor of the UE 100 even before the UE 100 further requests the PDN connection. For example, if a further PDN connection using the PGW 130 is created in a situation where the default GW of the UE 100 is the LGW 110, an address selection policy for an IP address of the LGW 110 may be modified from "being usable for all flows" to "being usable for a flow not requiring IP session persistence". Therefore, in the exemplary embodiment of the present invention, the UE 100 may transmit the PDN connectivity accept message including modified address selection information for the IP address of the GW which is currently operating as the mobility anchor of the UE 100. According to the exemplary embodiment, if an IP address of a specific GW can be used for any flow irrespective of the IP session persistence, the MME 400 may not allow the PDN connectivity accept message to include address selection policy information regarding the IP address of the specific GW.

In addition, in step 1007, the MME 400 may detect whether a handover event of the UE 100 occurs. If the handover event of the UE 100 does not occur, the MME 400 may end the procedure according to the exemplary embodiment of the present invention.

Meanwhile, if the handover event of the UE 100 occurs, in step 1009, the UE 400 may transmit address selection policy information for a new GW or modified address selection policy information for an old GW to the UE by using a handover command message. For example, if the MME 400 discovers the new GW due to the handover of the UE 100, the UE 100 may transmit the handover command message including at least one of attribute information regarding the newly discovered GW (e.g., information indicating whether the new GW supports the IP session persistence) and address selection policy information from the handover command message. For another example, if one PDN connection using a specific-type GW ends due to the handover of the UE 100 and only one PDN connection using a different-type GW is maintained, the MME 400 may transmit the handover command message including modified address selection policy information for the different-type GW of which the connection is maintained.

Thereafter, the MME 400 ends the procedure according to the exemplary embodiment of the present invention.

Figure 11:
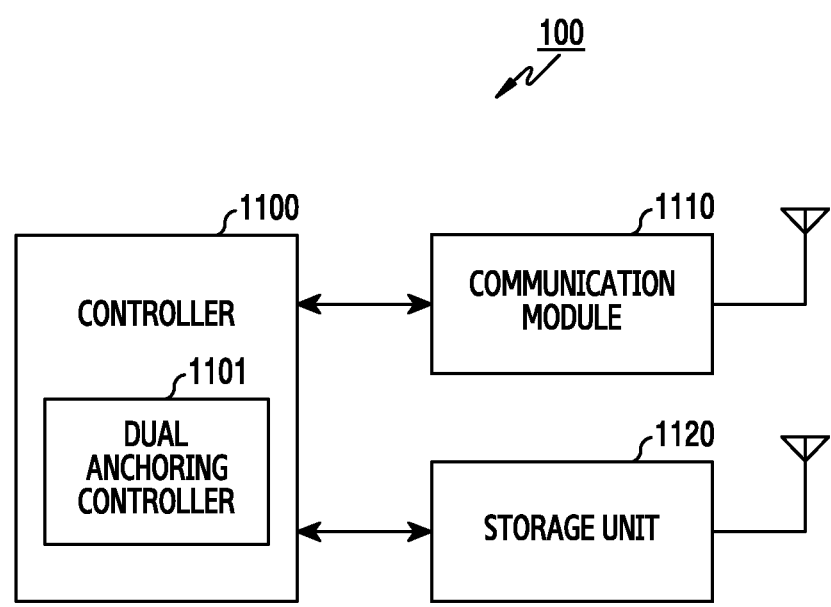
FIG. 11 illustrates a block diagram of a UE according to an exemplary embodiment of the present invention.

FIG. 11 illustrates a block diagram of a UE according to an exemplary embodiment of the present invention.

Referring to FIG. 11, the UE 100 may be configured to include a controller 1100, a communication module 1110, and a storage unit 1120.

The controller 1110 controls and processes an overall operation of the UE 100. In particular, the controller 1100 includes a dual anchoring controller 1101 to control an overall operation and procedure for dual anchoring. For example, the dual anchoring controller 1101 may control the on-demand dual anchoring shown in FIG. 1A to FIG. 2B or the permanent dual anchoring shown in FIG. 3.

Specifically, for example, the dual anchoring controller 1101 controls and processes a function for establishing a default PDN connection by anchoring to a specific-type GW determined by the MME 400 during an initial access procedure or a handover procedure. The dual anchoring controller 1101 may establish one default PDN connection by anchoring to one specific-type GW when supporting the on-demand dual anchoring, and may establish two default PDN connections by anchoring to two different-type GWs, respectively, when supporting the permanent dual anchoring. According to the exemplary embodiment, the dual anchoring controller 1101 may acquire address selection policy information and/or attribute information regarding a PDN connection of the UE 100 (e.g., information indicating whether the IP session persistence is supported) from the MME 400 during the initial access procedure or the handover procedure.

Further, upon detecting a new flow generated by an application executed by the UE, the dual anchoring controller 1101 may confirm a feature of the new flow, and may compare the feature of the new flow with attribute information of the anchored GW to determine whether a further PDN connection is required. For example, if the new flow requires the IP session persistence and the anchored GW does not support the IP session persistence, the dual anchoring controller 1101 may determine that the further PDN connection is required. For another example, if the new flow does not require the IP session persistence and the anchored GW supports the IP session persistence, the dual anchoring controller 1101 may determine that the further PDN connection is required. For another example, if the new flow requires the IP session persistence and the anchored GW supports the IP session persistence, the dual anchoring controller 1101 may determine that the further PDN connection is not required. According to the exemplary embodiment, the dual anchoring controller 1101 may determine whether the new flow requires the IP session persistence by using information such as an identifier of an application corresponding to the new flow, a type of the application, a feature of the application, a destination port number, a destination IP address, or the like.

In addition, when it is determined that the further PDN connection is required, the dual anchoring controller 1101 controls and processes a function for transmitting to the network a message requesting for the further PDN connection. According to the exemplary embodiment, the dual anchoring controller 1101 may transmit a PDN connectivity request message including information regarding whether the further PDN connection needs to support the IP session persistence. The dual anchoring controller 1101 may acquire an address selection policy for a further GW through a response message for the PDN connectivity request. For example, the dual anchoring controller 1101 may acquire a PDN connectivity accept message from an RRC connection reconfiguration message received in response to the PDN connectivity request, and may acquire address selection policy information regarding a GW which is used in a further PDN connection of the UE 100 from the PDN connectivity accept message. For example, the address selection policy may indicate a relation between an IP address allocated by the GW and whether IP session persistence is supported. In addition, the PDN connectivity accept message according to the exemplary embodiment of the present invention may include an address selection policy regarding an IP address of at least one different GW which is currently in use in a PDN connection of the UE 100, that is, a default GW which has been operating as a mobility anchor of the UE 100 even before the UE 100 further requests the PDN connection. Therefore, in the exemplary embodiment of the present invention, the dual anchoring controller 1101 may acquire modified address selection information for the IP address of the GW which is currently operating as the mobility anchor of the UE 100 from the PDN connectivity accept message. According to the exemplary embodiment, if the address selection policy for an IP address of a specific GW is not included in the PDN connectivity accept message, the dual anchoring controller 1101 may interpret this as that the IP address of the specific GW can be used for any flow irrespective of the IP session persistence.

Further, the dual anchoring controller 1101 may select a source IP address of a new flow on the basis of a feature of the new flow and information of a GW. For example, if the new flow requires the IP session persistence, the dual anchoring controller 1101 may confirm a GW supporting the IP session persistence on the basis of an address selection policy and/or attribute information of each GW corresponding to a PDN connection of the UE 100, and may select an IP address allocated by the confirmed GW as a source IP address of the new flow. The dual anchoring controller 1101 controls and processes a function for transmitting/receiving data for a new flow on the basis of the selected source IP address.

In addition, when the handover event occurs, the dual anchoring controller 1101 may receive address selection policy information for a new GW or modified address selection policy information for an old GW from a handover command message. For example, upon discovering the new GW by an MME due to the handover of the UE 100, the dual anchoring controller 1101 may acquire at least one of attribute information regarding the newly discovered GW (e.g., information indicating whether the new GW supports the IP session persistence) and address selection policy information from the handover command message. For another example, if one PDN connection using a specific-type GW ends due to the handover of the UE 100 and only one PDN connection using a different-type GW is maintained, the dual anchoring controller 1101 may receive modified address selection policy information for the different-type GW of which the connection is maintained from the handover command message.

In addition, when the new flow ends, the dual anchoring controller 1101 may perform a procedure for disconnecting the further PDN connection established for the new flow. For example, if the new flow using the further PDN connection ends and a pre-set delay period elapses from a time of ending the new flow, the dual anchoring controller 1101 may disconnect the further PDN connection.

The communication module 1110 processes signal transmission/reception under the control of the controller 1100. In particular, the communication module 1110 may transmit/receive a signal with respect to a network node (e.g., the MME 400) via an eNodeB for dual anchoring of the UE 100.

The storage unit 1120 stores a variety of data and programs required for an overall operation of the UE 100. The storage unit 1120 may include at least one application. The storage unit 1120 may store information related to an anchored GW. For example, an IP address allocated by the anchored GW, attribute information indicating whether the anchored GW supports IP session persistence, an address selection policy for the IP address allocated by the anchored GW, or the like may be stored.

Figure 12:
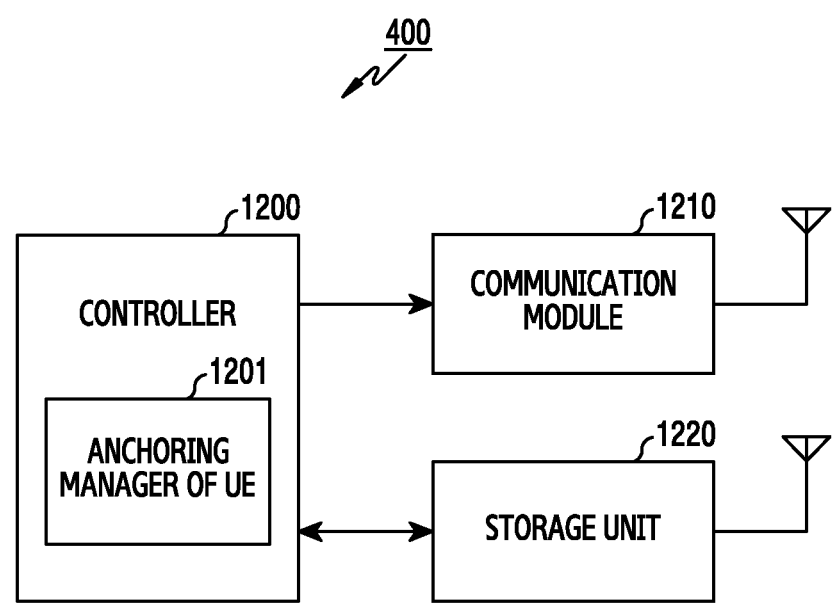
FIG. 12 illustrates a block diagram of an MME according to an exemplary embodiment of the present invention.

FIG. 12 illustrates a block diagram of an MME according to an exemplary embodiment of the present invention.

Referring to FIG. 12, the MME 400 may be configured to include a controller 1200, a communication module 1210, and a storage unit 1220.

The controller 1200 controls a function related to mobility of at least one UE 100. In particular, the controller 1200 include an anchoring manager 1201 of the UE to control an operation and procedure for dual anchoring of the UE 100. For example, the anchoring manager 1201 of the UE may control the on-demand dual anchoring shown in FIG. 1A to FIG. 2B or the permanent dual anchoring shown in FIG. 3.

Specifically, for example, the anchoring manager 1201 of the UE determines a GW closest to a position of the UE 100 as a mobility anchor of the UE during an initial access procedure or a handover procedure of the UE, and controls and processes a function for establishing a PDN connection of the UE 100 via the determined GW. When supporting the on-demand dual anchoring, the anchoring manager 1201 may determine one specific-type GW, and may control a function for establishing one default PDN connection. On the other hand, when supporting the permanent dual anchoring, the anchoring manager 1201 may determine two different-type GWs, and may establish two default PDN connections by using the two GWs. The anchoring manager 1201 of the UE may transmit address selection policy information and/or attribute information of the GW determined as the mobility anchor of the UE (e.g., information indicating whether the IP session persistence is supported) during the initial access procedure or the handover procedure.

The anchoring manager 1201 of the UE may determine a type of a GW to be used as a default mobility anchor of the UE 100 by considering an operator policy or whether applications frequently used by the UE 100 require the IP session persistence. According to the exemplary embodiment, the anchoring manager 1201 may receive information regarding a type of a GW preferred by the UE 100 as the mobility anchor from the UE 100.

When information regarding whether the further PDN connection needs to support the IP session persistence is received from the UE 100, the anchoring manager 1201 may determine a type of a GW for establishing a further PDN connection on the basis of the information regarding whether the further PDN connection needs to support the IP session persistence. The anchoring manager 1201 may determine a GW closest to a position of the UE 100 among determined-type GWs as a further GW which will operate as the mobility anchor for the further PDN connection.

The anchoring manager 1201 of the UE may transmit an address selection policy for the further GW through a response message for a PDN connectivity request. For example, the anchoring manager 1201 may transmit a PDN connectivity access message including address selection policy information regarding the GW used in the further PDN connection of the UE. For example, the address selection policy information may indicate whether an IP address allocated by the GW supports the IP session persistence. In addition, the anchoring manager 1201 of the UE according to the exemplary embodiment of the present invention may transmit the PDN connectivity accept message including an address selection policy regarding an IP address of at least one different GW which is currently in use in a PDN connection of the UE 100, that is, a default GW which has been operating as a mobility anchor of the UE 100 even before the UE 100 further requests the PDN connection. According to the exemplary embodiment, if an IP address of a specific GW can be used for any flow irrespective of the IP session persistence, the anchoring manager 1201 of the UE may not allow the PDN connectivity accept message to include address selection policy information regarding the IP address of the specific GW.

In addition, if the handover event of the UE occurs, the anchoring manager 1201 of the UE may transmit address selection policy information for a new GW or modified address selection policy information for an old GW to the UE by using a handover command message. For example, if the new GW is discovered due to the handover of the UE, the anchoring manager 1201 of the UE may transmit the handover command message including at least one of address selection policy information and attribute information regarding the newly discovered GW (e.g., information indicating whether the new GW supports the IP session persistence). For another example, if one PDN connection using a specific-type GW ends due to the handover of the UE and only one PDN connection using a different-type GW is maintained, the anchoring manager 1201 of the UE may transmit the handover command message including modified address selection policy information for the different-type GW of which the connection is maintained.

The communication module 1210 processes signal transmission/reception under the control of the controller 1200. In particular, the communication module 1210 may transmit/receive a signal with respect to at least one UE via an eNodeB for dual anchoring of the UE 100.

The storage unit 1220 stores a variety of data and programs required for an overall operation of the MME 400. The storage unit 1220 may store information related to at least one GW. For example, an address selection policy and attribute information of each of a plurality of GWs managed by the MME 400 may be stored. Further, the storage unit 1220 may store information regarding a GW to which each UE is anchored.

According to the exemplary embodiment, as attribute information of a GW operating as a mobility anchor during the initial access procedure, the UE 100 may receive not only information indicating whether the IP session persistence is supported but also address selection information regarding an IP address allocated by the GW together. Further, according to the exemplary embodiment, if address selection information of a specific GW is not included in a message capable of including attribute information regarding the GW (e.g., an attach accept message, a PDN connectivity accept message, or a handover command message), the UE 100 may interpret this as that an IP address allocated by the specific GW can be used for all of any flows.

According to various exemplary embodiments of the present invention, a method of anchoring of a terminal in a wireless communication system may include receiving attribute information indicating whether at least one gateway operating as an anchor for at least one default Packet Data Network (PDN) connection supports session persistence, detecting a new flow generated by an application, determining whether a further PDN connection is required for the flow on the basis of the attribute information indicating whether at least one gateway supports session persistence, and if no further PDN connection is required for the flow, using an Internet Protocol (IP) address allocated by the at least one gateway as a source IP address of the flow.

According to various exemplary embodiments of the present invention, the method of anchoring the terminal may include determining a type of a gateway for the at least one default PDN connection on the basis of whether at least one application executed by the terminal requires IP session persistence, and transmitting information of the determined gateway type to a mobility management entity. The gateway type may include at least one of a first type supporting the IP session persistence, a second type not supporting the IP session persistence, and a third type partially supporting the IP session persistence.

According to various exemplary embodiments of the present invention, the receiving of attribute information indicating whether at least one gateway supports session persistence may include allocating an IP address by the at least one gateway, and receiving address selection policy information regarding the allocated IP address. The address selection policy information may indicate whether the IP address supports IP session persistence.

According to various exemplary embodiments of the present invention, the determining of whether the further PDN connection is required for the flow on the basis of the attribute information indicating whether at least one gateway supports session persistence may include determining whether the flow requires the session persistence, and determining whether the further PDN connection is required on the basis of the attribute information indicating whether the at least one gateway supports the session persistence and whether the flow requires the session persistence. Whether the flow requires the session persistence may be determined on the basis of at least one of an identifier of an application corresponding to the flow, a type of the application corresponding to the flow, a feature of the application corresponding to the flow, a destination port number of the flow, and a destination IP address of the flow.

According to various exemplary embodiments of the present invention, the method of anchoring the terminal may include, if the further PDN connection is required for the flow, determining a type of a gateway for the further PDN connection, and requesting a network to establish the further PDN connection by using the gateway of the determined type. The gateway type may include at least one of a first type supporting the IP session persistence, a second type not supporting the IP session persistence, and a third type partially supporting the IP session persistence.

According to various exemplary embodiments of the present invention, the method of anchoring the terminal may include receiving address selection policy information regarding a further gateway operating as an anchor for the further PDN connection and address selection policy information regarding at least one gateway operating as an anchor for the at least one default PND connection, and determining a source IP address of the flow on the basis of the received address selection policy information. The address selection policy information may indicate whether an IP address allocated by the gateway supports the IP session persistence.

According to various exemplary embodiments of the present invention, the method of anchoring the terminal may include disconnecting the further PDN connection when the flow ends, and updating the address selection policy information regarding the at least one gateway operating as the anchor for the at least one default PDN connection.

According to various exemplary embodiments of the present invention, the method of anchoring the terminal may include detecting a handover event, and receiving at least one of an address selection policy for the at least one gateway and attribute information regarding a new gateway during the handover procedure.

According to various exemplary embodiments of the present invention, a method of a mobility management entity for anchoring of a terminal in a wireless communication system may include determining at least one gateway operating as an anchor for at least one default PDN connection of the terminal, and transmitting attribute information indicating whether the determined at least one gateway supports session persistence to the terminal.

According to various exemplary embodiments of the present invention, the method of the mobility management entity may include receiving information regarding a type of a gateway for the at least one default PDN connection from the terminal. The gateway type may include at least one of a first type supporting the IP session persistence, a second type not supporting the IP session persistence, and a third type partially supporting the IP session persistence.

According to various exemplary embodiments of the present invention, the transmitting of the attribute information indicating whether the determined one least one gateway supports session persistence to the terminal may include transmitting an IP address for the at least one gateway and address selection policy information for the IP address. The address selection policy information may indicate whether the IP address supports IP session persistence.

According to various exemplary embodiments of the present invention, the method of the mobility management entity may include requesting a request from the terminal to establish a further PDN connection including gateway type information, establishing the further PDN connection by using a further gateway corresponding to the type information, and transmitting, to the terminal, address selection policy information regarding a further gateway operating as an anchor for the further PDN connection and address selection policy information regarding at least one gateway operating as an anchor for the at least one default PND connection. The gateway type may include at least one of a first type supporting the IP session persistence, a second type not supporting the IP session persistence, and a third type partially supporting the IP session persistence. The address selection policy information may indicate whether an IP address allocated by the gateway supports IP session persistence.

According to various exemplary embodiments of the present invention, the method of the mobility management entity may include detecting a handover event of the terminal, and transmitting, to the terminal, at least one of an address selection policy for the at least one gateway and attribute information regarding a new gateway during the handover procedure.

According to various exemplary embodiments of the present invention, an apparatus for anchoring of a terminal in a wireless communication system may include a communication module for a communication module for transmitting/receiving a signal, and a controller for controlling the communication module to receive attribute information indicating whether at least one gateway operating as an anchor for at least one default PDN connection supports session persistence, detect a new flow generated by an application, determining whether a further PDN connection is required for the flow on the basis of the attribute information indicating whether at least one gateway supports session persistence, and if no further PDN connection is required for the flow, use an IP address allocated by the at least one gateway as a source IP address of the flow.

According to various exemplary embodiments of the present invention, the controller may provide control to determine a type of a gateway for the at least one default PDN connection on the basis of whether at least one application executed by the terminal requires IP session persistence, and may transmit information of the determined gateway type to a mobility management entity. The gateway type may include at least one of a first type supporting the IP session persistence, a second type not supporting the IP session persistence, and a third type partially supporting the IP session persistence.

According to various exemplary embodiments of the present invention, the controller may use the communication module to allocate an IP address by the at least one gateway, and receive address selection policy information regarding the allocated IP address. The address selection policy information may indicate whether the IP address supports IP session persistence.

According to various exemplary embodiments of the present invention, the controller may determine whether the flow requires the session persistence, and may determine whether the further PDN connection is required on the basis of the attribute information indicating whether the at least one gateway supports the session persistence and whether the flow requires the session persistence. Whether the flow requires the session persistence may be determined on the basis of at least one of an identifier of an application corresponding to the flow, a type of the application corresponding to the flow, a feature of the application corresponding to the flow, a destination port number of the flow, and a destination IP address of the flow.

According to various exemplary embodiments of the present invention, if the further PDN connection is required for the flow, the controller may provide control to determine a type of a gateway for the further PDN connection, and may request a network to establish the further PDN connection by using the gateway of the determined type. The gateway type may include at least one of a first type supporting the IP session persistence, a second type not supporting the IP session persistence, and a third type partially supporting the IP session persistence.

According to various exemplary embodiments of the present invention, the controller may provide control to receive address selection policy information regarding a further gateway operating as an anchor for the further PDN connection and address selection policy information regarding at least one gateway operating as an anchor for the at least one default PND connection, and may determine a source IP address of the flow on the basis of the received address selection policy information. The address selection policy information may indicate whether an IP address allocated by the gateway supports the IP session persistence.

According to various exemplary embodiments of the present invention, the controller may disconnect the further PDN connection when the flow ends, and may update the address selection policy information regarding the at least one gateway operating as the anchor for the at least one default PDN connection.

According to various exemplary embodiments of the present invention, the controller may provide control to detect a handover event, and may receive at least one of an address selection policy for the at least one gateway and attribute information regarding a new gateway during the handover procedure.

According to various exemplary embodiments of the present invention, an apparatus of a mobility management entity for anchoring of a terminal in a wireless communication system may include a communication module for transmitting/receiving a signal with respect to at least one terminal, and a controller for determining at least one gateway operating as an anchor for at least one default PDN connection of the terminal, and transmitting attribute information indicating whether the determined at least one gateway supports session persistence to the terminal.

According to various exemplary embodiments of the present invention, the controller may control the communication module to receive information regarding a type of a gateway for the at least one default PDN connection from the terminal. The gateway type may include at least one of a first type supporting the IP session persistence, a second type not supporting the IP session persistence, and a third type partially supporting the IP session persistence.

According to various exemplary embodiments of the present invention, the controller may control the communication module to transmit an IP address for the at least one gateway and address selection policy information for the IP address. The address selection policy information may indicate whether the IP address supports IP session persistence.

According to various exemplary embodiments of the present invention, the controller may control the communication module to receive a request from the terminal to establish a further PDN connection including gateway type information, establish the further PDN connection by using a further gateway corresponding to the type information, and transmit, to the terminal, address selection policy information regarding a further gateway operating as an anchor for the further PDN connection and address selection policy information regarding at least one gateway operating as an anchor for the at least one default PND connection. The gateway type may include at least one of a first type supporting the IP session persistence, a second type not supporting the IP session persistence, and a third type partially supporting the IP session persistence. The address selection policy information may indicate whether an IP address allocated by the gateway supports IP session persistence.

According to various exemplary embodiments of the present invention, the controller may control the communication module to detect a handover event of the terminal, and transmit, to the terminal, at least one of an address selection policy for the at least one gateway and attribute information regarding a new gateway during the handover procedure.

While the present invention has been particularly shown and described with reference to exemplary embodiments thereof, it will be understood by those skilled in the art that various modifications and changes in form and details may be made therein without departing from the spirit of the invention.

Operations according to exemplary embodiments of the present invention may be implemented by a single controller. In this case, a program instruction for performing an operation implemented with various computers may be recorded in a computer readable recording medium. The computer readable recording medium may include a program instruction, a data file, a data structure, etc., in an independent or combined manner. The program instruction may be designed and configured particularly for the present invention, or may be known and usable to those ordinarily skilled in the art. The computer readable recording medium may be a hardware device configured particularly to store and perform a program instruction, for example, a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), a flash memory, etc. An example of the program instruction includes not only a machine language created by a compiler but also a high-level language executable by a computer by using an interpreter or the like. When a base station or a relay described in the present invention is entirely or partially implemented with a computer program, a computer readable recording medium which stores the computer program is also included in the present invention. Therefore, the scope of the invention is defined not by the detailed description of the invention but by the appended claims, and all differences within the scope will be construed as being included in the present invention.

The invention claimed is:

1. A method of anchoring of a terminal in a wireless communication system, the method comprising:
    receiving attribute information indicating whether a gateway operating as an anchor for a default packet data network (PDN) connection supports internet protocol (IP) session persistence;
    detecting a flow generated by an application;
    determining whether an additional PDN connection is required for the flow based on the attribute information; and
    if no additional PDN connection is required for the flow, using an IP address allocated by the gateway as a source IP address of the flow.

2. The method of claim 1, further comprising:
    determining a type of the gateway for the default PDN connection based on whether the application executed by the terminal requires the IP session persistence; and
    transmitting information for the determined type of the gateway to a mobility management entity,
    wherein the determined type comprises one of a first type supporting the IP session persistence, a second type not supporting the IP session persistence, or a third type partially supporting the IP session persistence.

3. The method of claim 1, wherein the receiving of attribute information indicating whether a gateway supports IP session persistence comprises:
 receiving allocation of the IP address by the gateway; and
 receiving information regarding an IP address selection policy for the allocated IP address,
 wherein the address selection policy information indicates whether the allocated IP address supports the IP session persistence.

4. The method of claim 1, wherein the determining of whether an additional further PDN connection is required for the flow based on the attribute information comprises:
 determining whether the flow requires the IP session persistence; and
 determining whether the additional PDN connection is required based on the attribute information indicating whether the at least one gateway supports the IP session persistence and whether the flow requires the IP session persistence,
 wherein whether the flow requires the IP session persistence is determined based on at least one of an identifier of the application corresponding to the flow, a type of the application corresponding to the flow, a feature of the application corresponding to the flow, a port number of the flow for a destination, or the IP address of the flow for the destination.

5. The method of claim 1, further comprising:
 determining, if the additional PDN connection is required for the flow, a type of an additional gateway for the additional PDN connection; and
 requesting a network to establish the additional PDN connection by using the additional gateway,
 wherein the type comprises one of a first type supporting the IP session persistence, a second type not supporting the IP session persistence, or a third type partially supporting the IP session persistence.

6. The method of claim 5, further comprising:
 receiving first information regarding an IP address selection policy of the additional gateway operating as an anchor for the additional PDN connection and second information regarding an IP address selection policy of the gateway operating as the anchor for the default PND connection; and
 determining the source IP address of the flow based on the received first and second information regarding the IP address selection policy,
 wherein the first information indicates whether an IP address allocated by the additional gateway supports the IP session persistence, and
 wherein the second information indicates whether the IP address allocated by the gateway supports the IP session persistence.

7. The method of claim 1, further comprising:
 detecting a handover event; and
 receiving at least one of information regarding an IP address selection policy of the gateway or attribute information regarding an additional gateway during a handover procedure.

8. A mobility management entity for anchoring of a terminal in a wireless communication system, the mobility management entity comprising:
 a controller configured to determine a gateway operating as an anchor for a default packet data network (PDN) connection of the terminal; and
 a transmitter configured to transmit attribute information indicating whether the determined gateway supports internet protocol (IP) session persistence to the terminal.

9. The mobility management entity of claim 8, further comprising:
 a receiver configured to receive information regarding a type of the gateway for the default PDN connection from the terminal,
 wherein the type of the gateway comprises one of a first type supporting the IP session persistence, a second type not supporting the IP session persistence, or a third type partially supporting the IP session persistence.

10. The mobility management entity of claim 8, wherein the transmitter is further configured to:
 transmit an IP address for the at least one gateway and information regarding an IP address selection policy for the IP address,
 wherein the information indicates whether the IP address supports the IP session persistence.

11. The mobility management entity of claim 8, further comprising:
 a receiver configured to receive a message comprising first information regarding a type of an additional gateway from the terminal to establish an additional PDN connection;
 wherein the controller is further configured to establish the additional PDN connection by using the additional gateway corresponding to the first information regarding the type of the additional gateway;
 wherein the transmitter is further configured to transmit, to the terminal, the first information regarding the type of the additional gateway operating as an anchor for the additional PDN connection and second information regarding a type of the gateway operating as the anchor for the default PND connection,
 wherein the type comprises one of a first type supporting the IP session persistence, a second type not supporting the IP session persistence, or a third type partially supporting the IP session persistence,
 wherein the first information indicates whether an IP address allocated by the additional gateway supports the IP session persistence, and
 wherein the second information indicates whether an IP address allocated by the gateway supports the IP session persistence.

12. The mobility management entity of claim 8, wherein the controller is further configured to:
 detect a handover event of the terminal,
 wherein the transmitter is further configured to transmit, to the terminal, at least one of information regarding an IP address selection policy of an additional gateway or the attribute information regarding the additional gateway during a handover procedure.

13. A terminal for anchoring in a wireless communication system, the terminal comprising:
 a receiver configured to receive attribute information indicating whether a gateway operating as an anchor for a packet data network (PDN) connection supports internet protocol (IP) session persistence; and
 a controller configured to:
  detect a flow generated by an application,
  determine whether an additional PDN connection is required for the flow based on the attribute information, and use, if no additional PDN connection is required for the flow, an IP address allocated by the gateway as a source IP address of the flow.

14. The terminal of claim 13, further comprising:
a transmitter configured to transmit information for a type of the gateway to a mobility management entity,
wherein the controller is further configured to determine the type of the gateway for the default PDN connection based on whether the application executed by the terminal requires the IP session persistence, and
wherein the determined type comprises one of a first type supporting the IP session persistence, a second type not supporting the IP session persistence, or a third type partially supporting the IP session persistence.

15. The terminal of claim 13, wherein the receiver is further configured to:
receive allocation of the IP address by the gateway; and
receive information regarding an IP address selection policy for the allocated IP address,
wherein the information indicates whether the allocated IP address supports the IP session persistence.

16. The terminal of claim 13, wherein the controller is further configured to:
determine whether the flow requires the IP session persistence; and
determine whether the additional PDN connection is required based on the attribute information indicating whether the gateway supports the IP session persistence and whether the flow requires the IP session persistence,
wherein whether the flow requires the IP session persistence is determined based on at least one of an identifier of the application corresponding to the flow, a type of the application corresponding to the flow, a feature of the application corresponding to the flow, a port number of the flow for a destination, or the IP address of the flow for the destination.

17. The terminal of claim 13, wherein the controller is further configured to:
determine, if the additional PDN connection is required for the flow, a type of an additional gateway for the additional PDN connection; and
request a network to establish the additional PDN connection by using the additional gateway,
wherein the type comprises one of a first type supporting the IP session persistence, a second type not supporting the IP session persistence, or a third type partially supporting the IP session persistence.

18. The terminal of claim 17,
wherein the receiver is further configured to receive first information regarding an IP address selection policy of the additional gateway operating as an anchor for the additional PDN connection and second information regarding an IP address selection policy of the gateway operating as the anchor for the default PDN connection,
wherein the controller is further configured to determine the source IP address of the flow based on the received first and second information regarding the IP address selection policy,
wherein the first information indicates whether an IP address allocated by the additional gateway supports the IP session persistence, and
wherein the second information indicates whether the IP address allocated by the gateway supports the IP session persistence.

19. The terminal of claim 18, wherein the controller is further configured to:
disconnect the additional PDN connection when the flow ends; and
update the second information regarding the gateway operating as the anchor for the default PDN connection.

20. The terminal of claim 13, wherein the controller is further configured to:
detect a handover event,
wherein the receiver is further configured to receive at least one of information regarding an IP address selection policy of the gateway or attribute information regarding an additional gateway during a handover procedure.

* * * * *